United States Patent
Ishikawa et al.

(10) Patent No.: US 9,411,478 B2
(45) Date of Patent: Aug. 9, 2016

(54) DISPLAY DEVICE

(71) Applicant: Japan Display Inc., Minato-ku (JP)

(72) Inventors: Miyuki Ishikawa, Tokyo (JP);
Masahiro Tada, Tokyo (JP); Takashi Nakamura, Tokyo (JP); Yutaka Umeda, Tokyo (JP); Hirotaka Hayashi, Tokyo (JP); Yoshiro Aoki, Tokyo (JP);
Takanori Tsunashima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 68 days.

(21) Appl. No.: 14/257,091

(22) Filed: Apr. 21, 2014

(65) Prior Publication Data
US 2014/0333852 A1    Nov. 13, 2014

(30) Foreign Application Priority Data
May 9, 2013    (JP) .................................. 2013-099646

(51) Int. Cl.
*G02F 1/1333*    (2006.01)
*G06F 3/044*    (2006.01)
*G06F 3/041*    (2006.01)

(52) U.S. Cl.
CPC ............ *G06F 3/044* (2013.01); *G02F 1/13338* (2013.01); *G06F 3/0412* (2013.01)

(58) Field of Classification Search
CPC .......................... G02F 1/13338; G02F 1/13439
See application file for complete search history.

(56) References Cited

U.S. PATENT DOCUMENTS

| 2004/0043676 | A1  | 3/2004 | Tada et al. |
| 2012/0044176 | A1* | 2/2012 | Nakamura ............ G06F 3/0412 345/173 |
| 2012/0206408 | A1* | 8/2012 | Brown .................... G06F 3/044 345/174 |
| 2013/0021544 | A1* | 1/2013 | Fukuyama .......... G02F 1/13338 349/12 |

FOREIGN PATENT DOCUMENTS

| JP | H06-317783 A | 11/1994 |
| JP | 2004-093894  | 3/2004  |
| JP | 2011-180739 A | 9/2011 |
| JP | 2012-043201 A | 3/2012 |

OTHER PUBLICATIONS

Office Action issued Jun. 7, 2016, in Japanese Patent Application No. 2013-099646 (with English language translation).

\* cited by examiner

*Primary Examiner* — Michael Caley
*Assistant Examiner* — Edmond Lau
(74) *Attorney, Agent, or Firm* — Oblon, McClelland, Maier & Neustadt, L.L.P.

(57) ABSTRACT

According to one embodiment, a display device includes a display panel having a counter substrate, an array substrate and a liquid crystal layer held therebetween, a counter electrode provided on the counter substrate, a pixel electrode arranged on the array substrate in a matrix, a sensor circuit arranged between rows of the plurality of pixel electrodes and configured to read out intensity of capacitive coupling between the sensor circuit and a dielectric, and a counter electrode drive circuit configured to pulsatively drive a common voltage added to the counter electrode during a period of driving the sensor circuit, wherein the sensor circuit comprises a detection electrode configured to form capacitance between the sensor circuit and the dielectric and to form capacitance between the sensor circuit and the counter electrode, and wherein the counter electrode comprises an aperture including at least a portion opposed to the detection electrode.

7 Claims, 18 Drawing Sheets

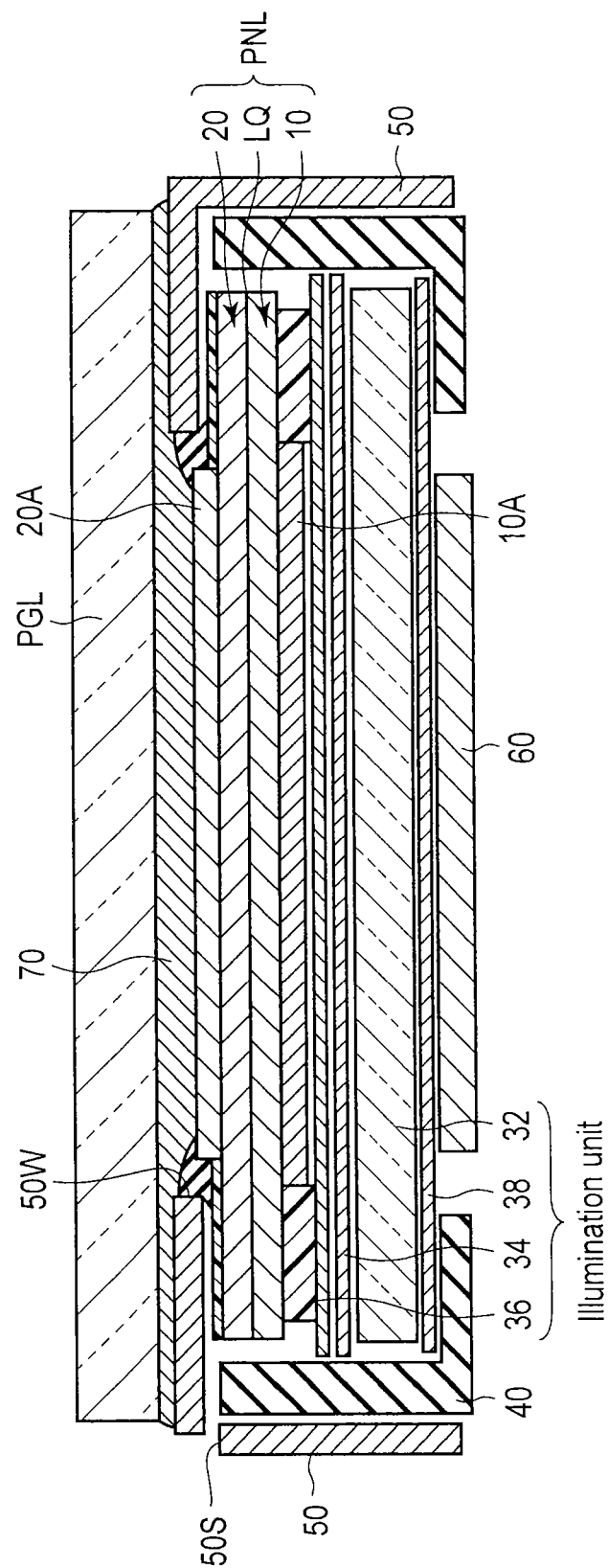
F I G. 1

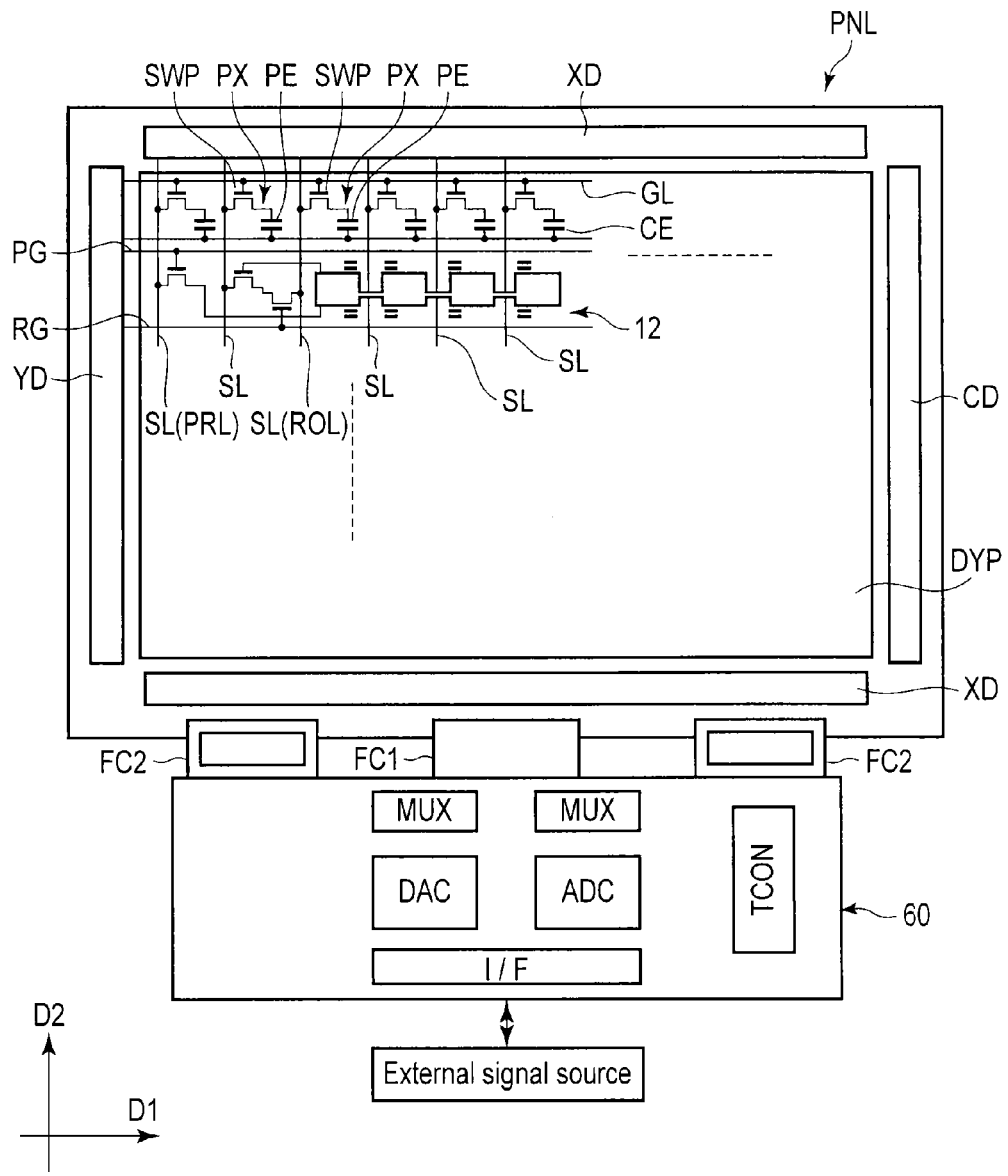
F I G. 4

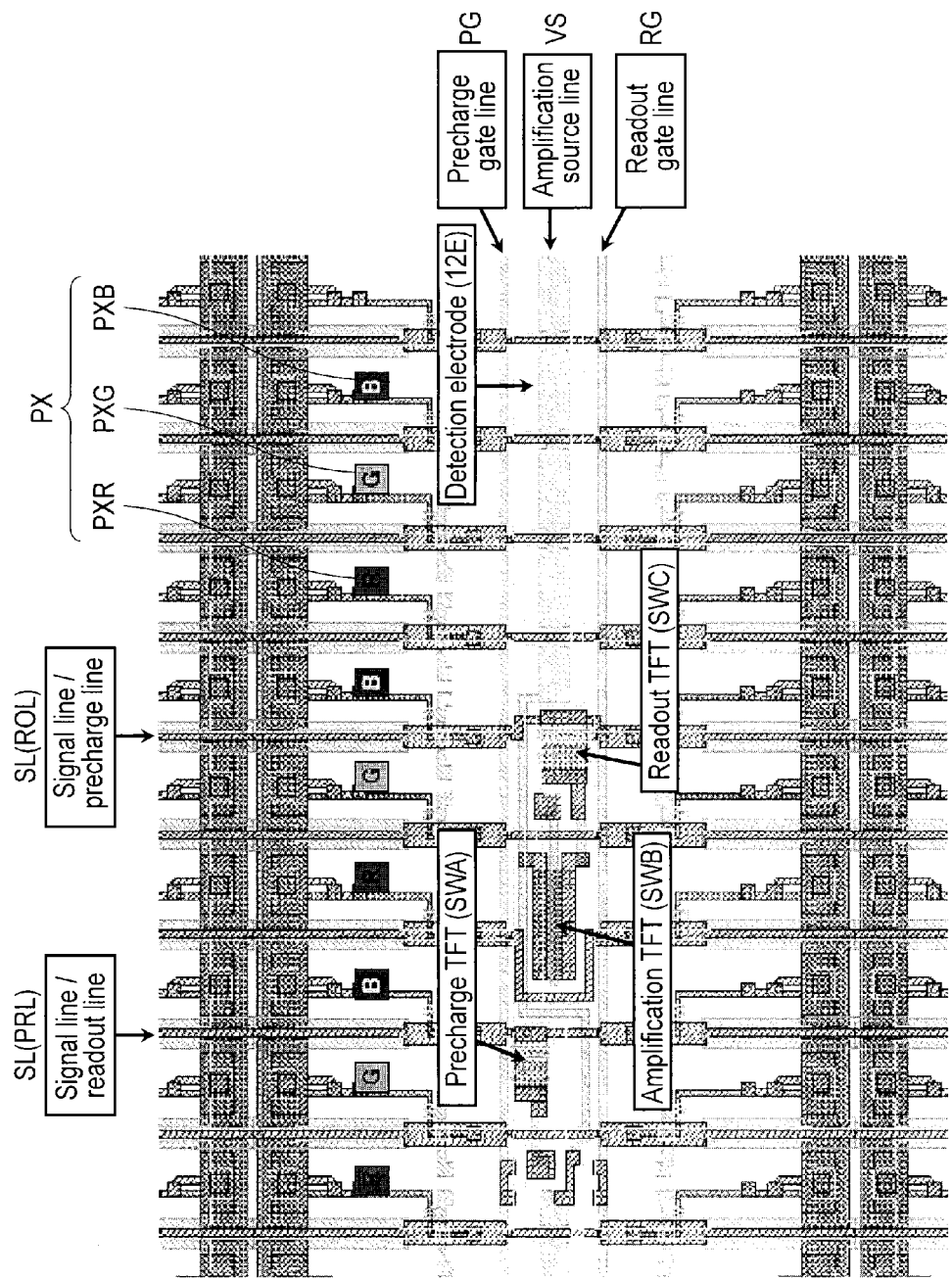
F I G. 8

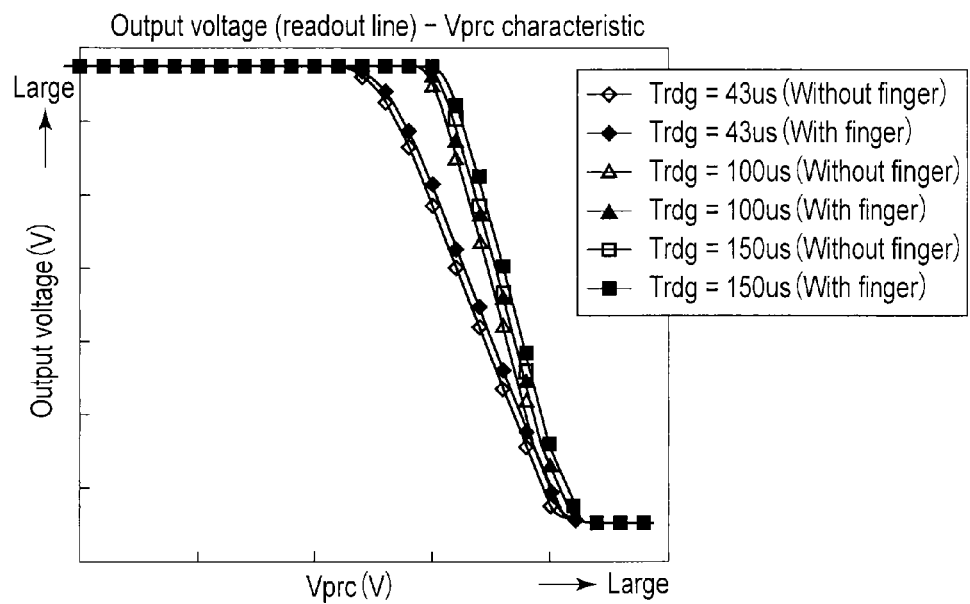
F I G. 10
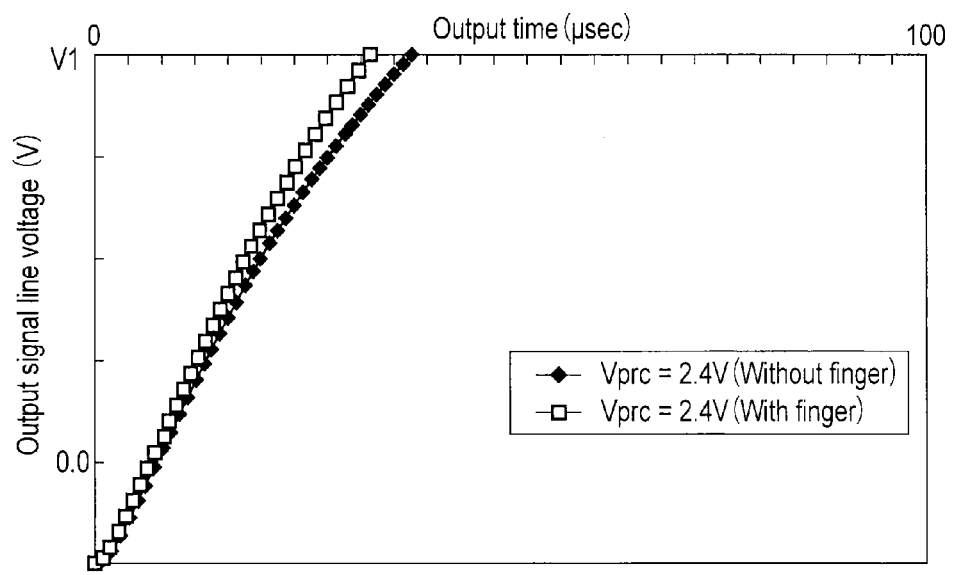
F I G. 11

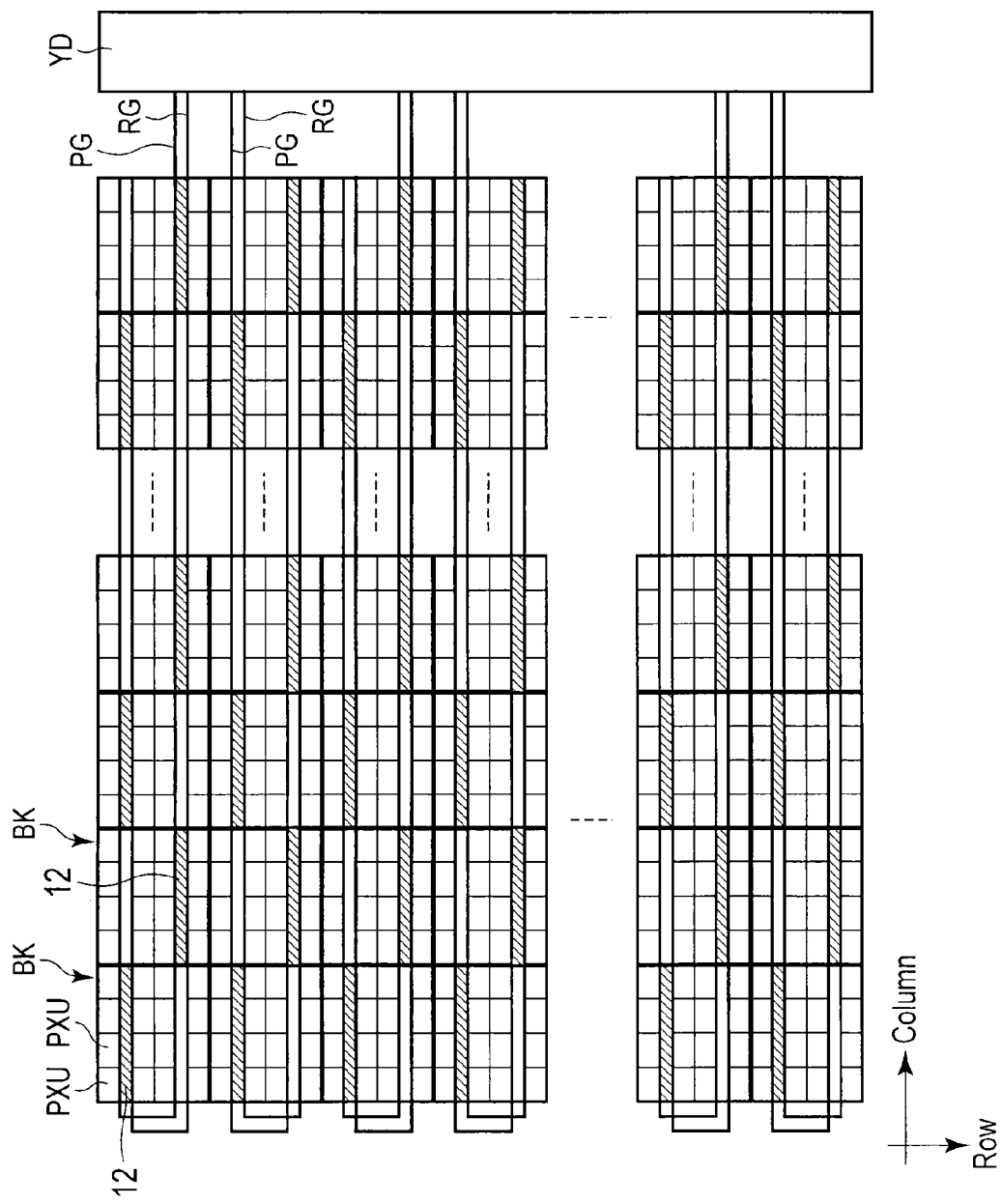
F I G. 19

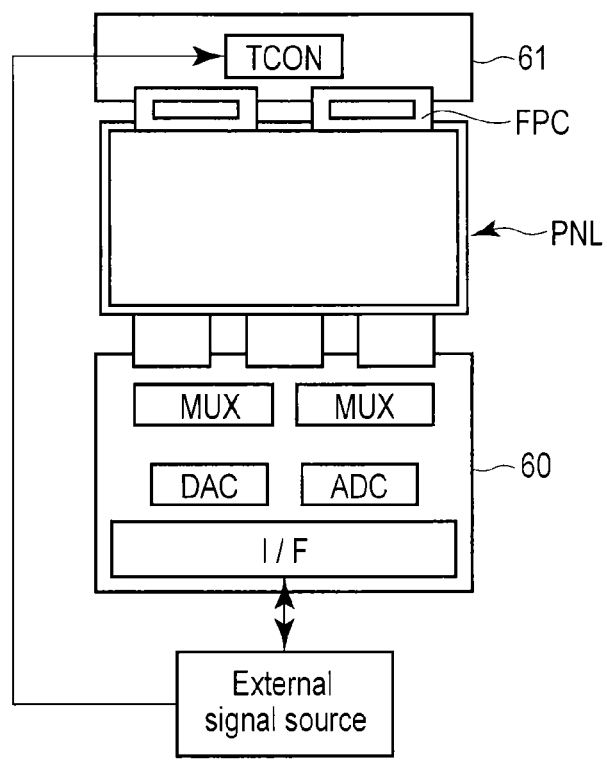
F I G. 23
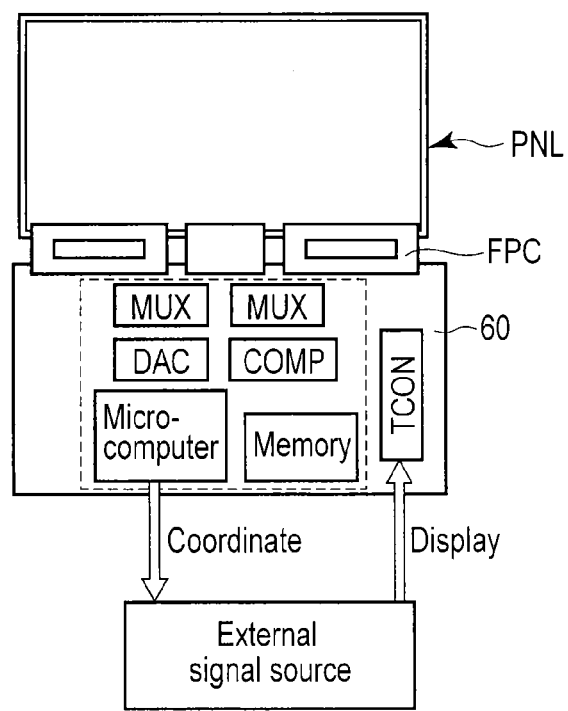
F I G. 24

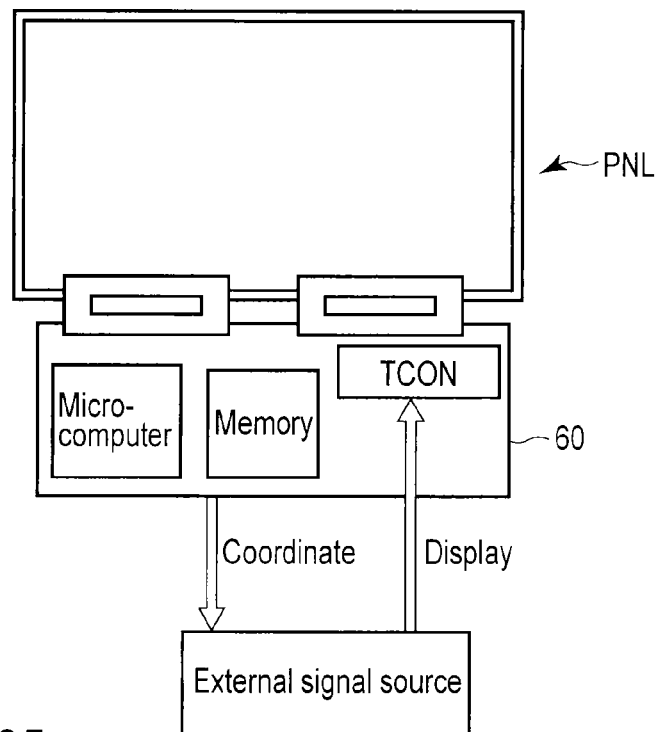
F I G. 25
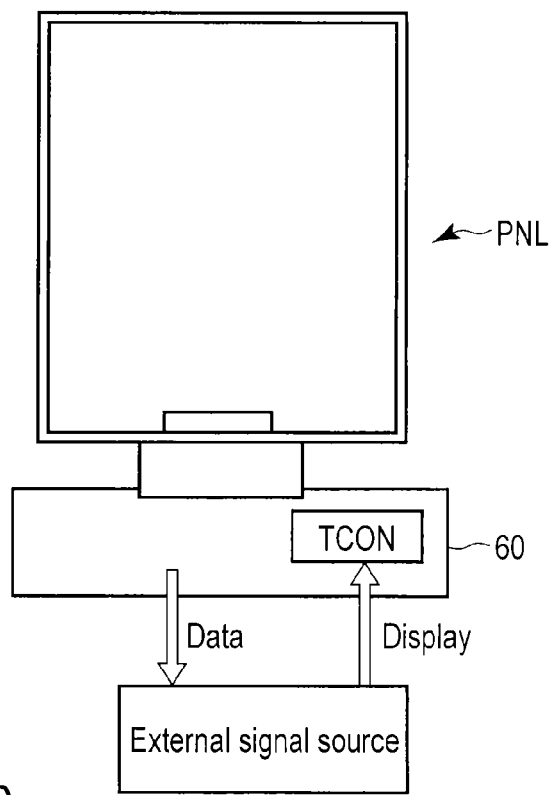
F I G. 26

DISPLAY DEVICE

CROSS-REFERENCE TO RELATED APPLICATIONS

This application is based upon and claims the benefit of priority from Japanese Patent Application No. 2013-099646, filed May 9, 2013, the entire contents of which are incorporated herein by reference.

FIELD

Embodiments described herein relate generally to a display device.

BACKGROUND

There is developed an electronic apparatus such as a mobile phone, a mobile information terminal and a personal computer equipped with a display device comprising a touch-panel function as a form of user interface. For an electronic apparatus comprising such a touchpanel function, it has been considered that touchpanel substrates are alternatively stuck to add a touch panel function to a display device such as liquid crystal display device and organic EL display device.

Also, in recent years, there has been developed a technology to manufacture an image-reading apparatus by forming a thin film from a variety of materials on a transparent insulating substrate such as glass substrate with a chemical vapor deposition (CVD) method and by forming a display element comprising a scanning line and a signal line, an optical sensor element and the like with the repetition of work such as cutting and grinding.

Further, as a reading mode of an image-reading apparatus, there is developed a technology to arrange a conductive electrode instead of an optical sensor element or the like and detect information about a finger or a pen on a panel surface based on the capacitance variation between the electrode and the finger or pen, i.e., a technology to detect a contact position by a so-called electrostatic capacitance system.

For a display device of using an electrostatic capacitance mode, there is actively developed a so-called in-cell technology to incorporate a sensor function into a display panel such as liquid crystal. The in-cell technology eliminates the need of sticking an alternatively-made touchpanel to liquid crystal, which prevents the increase of the thickness and weight of the whole of an electronic apparatus. In addition, such a technology is excellent in display quality, since the reflection of light that is likely to occur on a surface is not generated as no boundary surface exists between the liquid crystal and the touchpanel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary sectional view of a display device of a first embodiment.

FIG. 4 is an exemplary schematic plan view illustrating the liquid crystal display panel of the display device of the first embodiment.

FIG. 8 is an exemplary view of a configuration of an array substrate of the display device of the first embodiment.

FIG. 10 is an exemplary graph illustrating a relationship between a precharge voltage and an output voltage of the sensor circuit (a voltage of a readout line) of the display device of the first embodiment.

FIG. 11 is an exemplary graph illustrating a relationship between the output voltage and an output time of the sensor circuit by a difference of the precharge voltage of the display device of the first embodiment.

FIG. 19 is still further another exemplary view illustrating the arrangement position of the sensor circuit, the precharge gate line and the readout gate line of the display device of the first embodiment.

FIG. 23 is an exemplary diagram illustrating a configuration of a display device of a third embodiment.

FIG. 24 is another exemplary diagram illustrating the configuration of the display device of the third embodiment.

FIG. 25 is still another exemplary diagram illustrating the configuration of the display device of the third embodiment.

FIG. 26 is further another exemplary diagram illustrating the configuration of the display device of the third embodiment.

DETAILED DESCRIPTION

Figure 2:
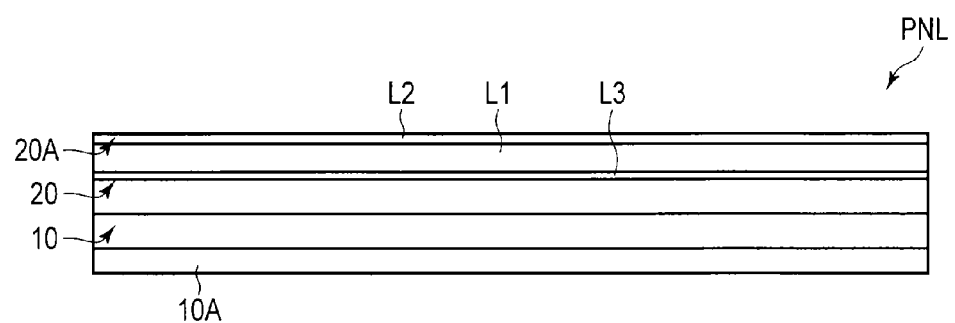
FIG. 2 is an exemplary view illustrating a configuration of a liquid crystal display panel of the display device of the first embodiment.

Various embodiments will be described hereinafter with reference to the accompanying drawings.

In general, according to one embodiment, a display device includes a display panel having a counter substrate, an array substrate and a liquid crystal layer held therebetween; a counter electrode provided on the counter substrate; a pixel electrode arranged on the array substrate in a matrix; a sensor circuit arranged between rows of the plurality of pixel electrodes and configured to read out intensity of capacitive coupling between the sensor circuit and a dielectric; and a counter electrode drive circuit configured to pulsatively drive a common voltage added to the counter electrode during a period of driving the sensor circuit, wherein the sensor circuit comprises a detection electrode configured to form capacitance between the sensor circuit and the dielectric and to form capacitance between the sensor circuit and the counter electrode; and wherein the counter electrode comprises an aperture including at least a portion opposed to the detection electrode.

First Embodiment

The display device of the first embodiment of the present invention will be described hereinafter with reference to the accompanying drawings.

FIG. 1 is an exemplary sectional view of the display device of the first embodiment.

The display device comprises a liquid crystal display panel PNL, an illuminant unit, a frame 40, a bezel cover 50, a circuit substrate 60 and a protective glass PGL.

The illuminant unit is arranged on the back side of the liquid crystal display panel PNL. The frame 40 supports the liquid crystal display panel PNL and the illuminant unit. The bezel cover 50 is attached to the frame 40 so that the display unit of the liquid crystal display panel PNL is exposed. The circuit substrate 60 is arranged on the back side of the frame 40. The protective glass PGL is fixed on the bezel cover 50 by an adhesive 70. The liquid crystal display panel PNL protects the display unit of the liquid crystal display panel PNL from outside impact. Note that the protective glass PGL may be omitted.

The illuminant unit comprises a light source (not shown), a light guide body 32, a prism sheet 34, a diffusion sheet 36 and a reflection sheet 38.

The light guide body 32 emits light incident from the light source to the liquid crystal display panel PNL. The prism sheet 34 and the diffusion sheet 36 are optical sheets arranged between the liquid crystal display panel PNL and the light guide body 32. The prism sheet 34 and the diffusion sheet 36 concentrate and diffuse light emitted from the light guide body 32. The reflection sheet 38 is arranged so as to be opposed to a principal plane of the light guide body 32, which is on the opposite side of the liquid crystal display panel PNL.

The liquid crystal display panel PNL comprises an array substrate 10, a counter substrate 20 arranged so as to be opposed to the array substrate 10, a liquid crystal layer LQ held between the array substrate 10 and the counter substrate 20, and a display unit DYP (not shown) comprising a plurality of display pixels arranged in a matrix. The array substrate 10 comprises a polarizer 10A attached on the principal plane, which is on the opposite side of the liquid crystal layer LQ. The counter substrate 20 comprises a polarizer 20A attached on the principal plane, which is on the opposite side of the liquid crystal layer LQ.

The frame 40 accommodates the illuminant unit and the liquid crystal display panel PNL in a state of being overlapped. The illuminant unit and the liquid crystal display panel PNL are positioned in a planar direction (D1-D2 plane) by the frame 40.

FIG. 2 is an exemplary view illustrating a configuration of the liquid crystal display panel PNL of the display device of the first embodiment.

The polarizer 20A comprises a polarization layer L1, an antistatic layer L2 and a conductive paste L3 with which to fix the polarization layer L1 on a transparent insulating substrate. The resistance value of the antistatic layer L2 is $6.3 \times 10^{10}$ ($\Omega/\square$), for example. The resistance value of the conductive paste L3 is $5.2 \times 10^{10}$ ($\Omega/\square$), for example.

If the antistatic layer L2 and the conductive paste L3 are not arranged, when a tip of finger or pen contacts the surface of the protective glass PGL and the surface of the polarizer 20A, charges that occur in contact with a tip of finger or pen are left on a contact region. In such a case, since it is identified that the contact continues even after a tip of finger or pen lets off, the reaction of separation is sometimes blunt.

On the other hand, the antistatic layer L2 and the conductive paste L3 made of material having a resistance of, for example, $0 \times 10^{9}$ ($\Omega/\square$) or more are arranged so that charges on the surface of the polarizer 20A can easily discharge. By connecting the antistatic layer L2 and the conductive paste L3 to the ground, it becomes possible to detect variation in capacitance by contact of a tip of finger or pen and to diffuse the remaining charges at the time of contact to realize rapid reaction during separation.

Therefore, even when input with a thin pen made of metal, for example, it is possible to detect capacitance variation with high precision. In addition, it is possible to prevent a sensor circuit (not shown) from malfunctioning due to electrification. Note that it is also possible that a detected area can be changed for an area on which a tip of finger or pen actually contacts, by changing a resistance value of the polarizer 20A.

Also, in a display device in which a display mode of a horizontal electric field mode such as in-plane switching (IPS) and fringe-field switching (FFS) is adopted, it may be possible that a transparent electrode layer is formed on the transparent insulating substrate of the counter substrate 20 to prevent burn-in due to static electricity or that the polarizer is set to conductive. In the display device of the first embodiment, such a measure is not necessary; it is possible to prevent burn-in by using the antistatic layer L2 and the conductive paste L3. Note that either of the antistatic layer L2 or the conductive paste L3 is arranged.

Figure 3:
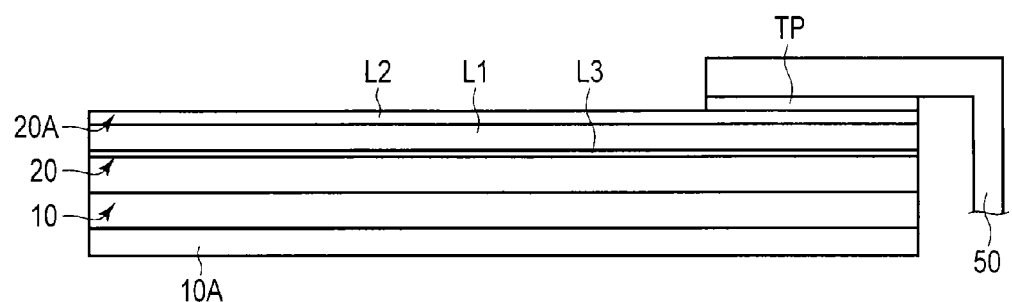
FIG. 3 is an exemplary view illustrating a configuration of the liquid crystal display panel and a bezel cover of the display device of the first embodiment.

FIG. 3 is an exemplary view illustrating a configuration of the liquid crystal display panel PNL and the bezel cover 50 of the display device of the first embodiment. One example of the configuration will be described hereinafter with reference to FIGS. 1 and 3.

The bezel cover 50 comprises a window 50W (shown in FIG. 1) with which to expose the display unit of the liquid crystal display panel PNL. The bezel cover 50 is fixed and electrically connected to the antistatic layer L2 of the polarizer 20A by a double-stick tape with conductive paste TP. The bezel cover 50 is connected to the ground so that the antistatic layer L2 is electrically connected to the ground via the bezel cover 50.

The circuit substrate 60 (shown in FIG. 1) is electrically connected to one end of the array substrate 10 of the liquid crystal display panel PNL by, for example, a flexible substrate FC1 (not shown). The flexible substrate FC1 is arranged to extend between the circuit substrate 60 and the array substrate 10 so as to be bent on the back side of the frame 40 via a slit 50S (shown in FIG. 1) of the bezel cover 50.

FIG. 4 is an exemplary schematic plan view illustrating the liquid crystal display panel PNL of the display device of the first embodiment.

The liquid crystal display panel PNL comprises the array substrate 10, the counter substrate 20, the liquid crystal layer LQ, the display unit DYP, a signal line drive circuit XD, a scanning line drive circuit YD and a counter electrode drive circuit CD.

The counter substrate 20 is arranged so as to be opposed to the array substrate 10. The liquid crystal layer LQ is held between the array substrate 10 and the counter substrate 20. In the display unit DYP, a pixel circuit comprising a plurality of pixels is arranged in a matrix. The signal line drive circuit XD, the scanning line drive circuit YD and the counter electrode drive circuit CD are drive circuits arranged around the display unit DYP.

The array substrate 10 comprises a transparent insulating substrate (not shown), a plurality of pixel electrodes PEs, scanning lines GLs, precharge gate lines PGs, readout gate lines RGs, signal lines SLs, pixel switches SWPs, and sensor circuits 12s.

The pixel electrode PE is arranged in a matrix, corresponding to each of a plurality of display pixels on the transparent insulating substrate. The plurality of scanning lines GLs, the precharge gate lines PGs and the readout gate lines RGs are arranged along with rows arranged by the pixel electrodes PEs. The plurality of signal lines SLs are arranged along with a row arranged by the pixel electrode PE. The pixel switch SWP is arranged adjacent to the position where the scanning line GL and the signal line SL cross with each other. The sensor circuit 12 comprises a detection electrode 12E.

Note that a counter electrode CE, which is formed so as to be opposed via the liquid crystal layer LQ, is arranged on the counter substrate.

The circuit substrate 60, which is equipped with a timing controller TCON via flexible wiring substrates FC1 and FC2, is electrically connected to the end portion of the array substrate 10.

The circuit substrate 60 comprises a multiplexer MUX, a D/A conversion unit DAC, an A/D conversion unit ADC and an interface unit I/F configured to transmit and receive a signal between the interface unit I/F and an external signal source.

A signal from the sensor circuit 12 is supplied to the A/D conversion unit ADC at a predetermined timing by the multiplexer MUX, converted to a digital signal and supplied to the interface unit I/F. The interface unit I/F outputs a received digital signal to the external signal source. The external signal source performs coordinate calculation by the received digital signal to detect the coordinate position contacted by a tip of finger or pen. The external signal source also outputs a signal for display.

The plurality of scanning lines GLs, the plurality of precharge gate lines PGs and the plurality of readout gate lines RGs are electrically connected to the scanning line drive circuit YD. The scanning line drive circuit YD supplies to the plurality of scanning lines GLs a gate voltage to turn on the pixel switches SWPs (conduct source-drain path) and drive the plurality of scanning lines GLs sequentially. Also, the scanning line drive circuit YD drives the plurality of precharge gate lines PGs and the plurality of readout gate lines RGs at a predetermined timing to drive the sensor circuits 12s.

The plurality of signal lines SLs are electrically connected to the signal line drive circuit XD. The signal line drive circuit XD supplies a video signal from the signal line SL to the pixel electrode PE via the pixel switch SWP in which the source-drain path is conducted.

The counter electrode drive circuit CD supplies a common voltage Vcom to the counter electrode CE. The counter electrode drive circuit CD changes the common voltage Vcom so as to correspond to the polarity inversion mode of the liquid crystal display device in image display operation. In the first embodiment, the counter electrode drive circuit CD pulsatively changes the common voltage Vcom, which is added to the counter electrode during a period when the sensor circuit 12 is further driven. Note that the effect of flash and flicker on a display image can be reduced by setting to tens of kHz or more the operation frequency that changes the common voltage.

Note that the signal line SL is also used as a precharge line PRL and a readout line ROL with which to supply a signal to the sensor circuit 12 during a period of driving the sensor circuit 12.

Figure 5:
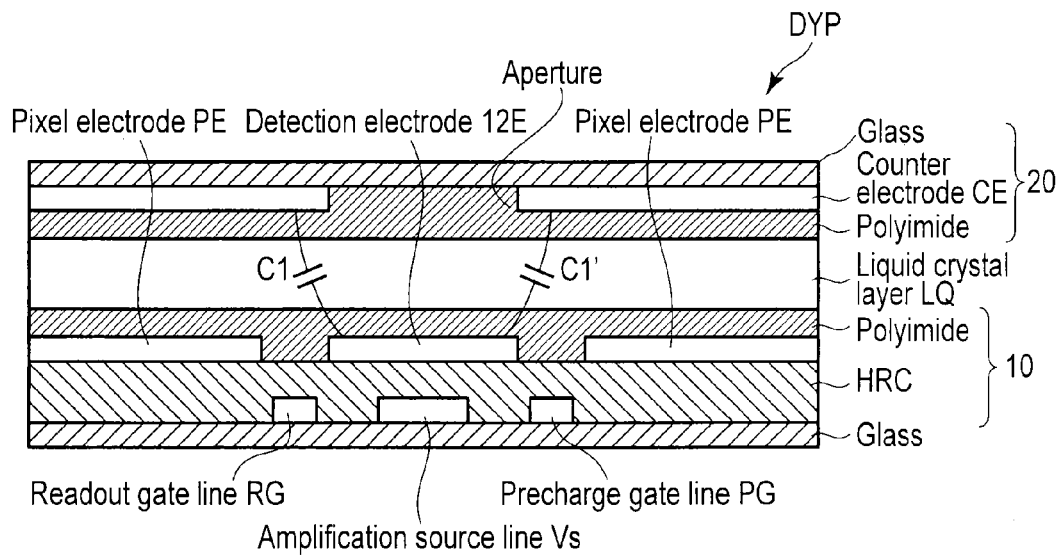
FIG. 5 is an exemplary pattern sectional view illustrating the display unit of the display device of the first embodiment.

FIG. 5 is an exemplary pattern sectional view illustrating the display unit DYP of the display device of the first embodiment.

The counter substrate 20 is arranged on the upper portion of the liquid crystal layer LQ and the array substrate 10 is arranged on the lower portion of the liquid crystal layer LQ. The counter electrode CE is arranged on the counter substrate 20. On the array substrate 10, the pixel electrode PE and the detection electrode 12E are arranged on the same layer, and the readout gate line RG, an amplification source line Vs and the precharge gate line PG are arranged on the same layer.

While the operation of the detection electrode 12E and the amplification source line Vs will be explained later, a portion opposed to the detection electrode 12E of the counter electrode CE is cut off in the display device of the first embodiment. As a result, capacitance can be formed more sensitively between the upper portion of the display unit DYP (touch portion) and the detection electrode 12E by a finger or pen that contacts the upper portion of the display unit DYP. Also, as shown in the figure, floating capacitance (C1 and C1') is formed between the counter electrode CE and the detection electrode 12E.

Figure 6:
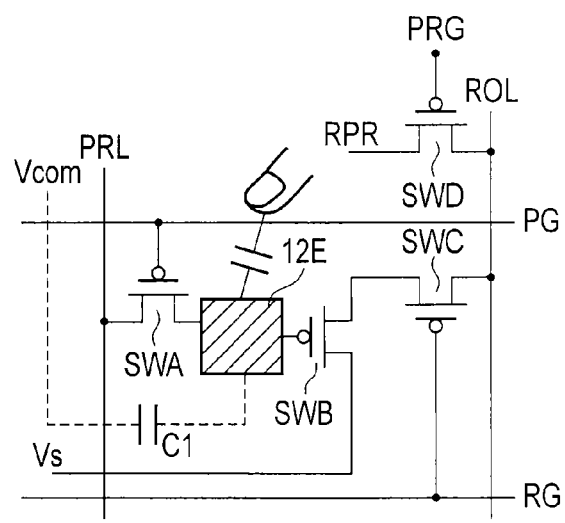
FIG. 6 is an exemplary view illustrating an equivalent circuit of one of the examples of a sensor circuit of the display device of the first embodiment.

FIG. 6 is an exemplary view illustrating an equivalent circuit of one of the examples of the sensor circuit 12 of the display device of the first embodiment.

The sensor circuit 12 is provided with the detection electrode 12E, the precharge line PRL, the readout line ROL, the precharge gate line PG, the readout gate line RG, the amplification source line Vs, a precharge switch SWA, an amplification switch SWB and a readout switch SWC. Also, as mentioned above, the counter electrode CE and the detection electrode 12E are connected via coupling capacitance C1, which is floating capacitance. The readout line ROL may be connected to, for example, capacitance for retaining a voltage (not shown).

The detection electrode 12E detects variation in detection capacitance by the presence or absence of a contact body. A precharge voltage is input from outside via the precharge line PRL. A detection voltage is taken out to the outside via the readout line ROL. A timing of inputting a precharge voltage from outside is controlled via the precharge gate line PG. A timing of taking out a detection voltage to the outside is controlled via the readout gate line RG. A predetermined voltage to form a detection voltage is supplied via the amplification source line Vs.

The precharge switch SWA writes and retains a precharge voltage in the detection electrode 12E. The coupling capacitance C1 adds the common voltage Vcom to the detection electrode 12E. The amplification switch SWB amplifies to a predetermined voltage a voltage generated in the detection electrode 12E. The readout switch SWC outputs the amplified voltage to the readout line ROL as a detection voltage and retains it.

The precharge switch SWA is, for example, a p-type thin-film transistor, in which a gate electrode is electrically connected to the precharge gate line PG (or configured integrally), a source electrode is electrically connected to the precharge line PRL (or configured integrally) and a drain electrode is electrically connected to the detection electrode 12E (or configured integrally).

The amplification switch SWB is, for example, a p-type thin-film transistor, in which the gate electrode is electrically connected to the detection electrode 12E (or configured integrally), the source electrode is electrically connected to the amplification source line Vs (or configured integrally) and the drain electrode is electrically connected to the readout switch SWC (or configured integrally).

The readout switch SWC is, for example, a p-type thin-film transistor, in which the gate electrode is electrically connected to the readout gate line RG (or configured integrally), the source electrode is electrically connected to the amplification switch SWB (or configured integrally) and the drain electrode is electrically connected to the readout line ROL (or configured integrally).

The precharge switch SWD is, for example, a p-type thin-film transistor, in which the gate electrode is electrically connected to a readout line precharge gate line PRG (or configured integrally), the source electrode is electrically connected to a readout line precharge line RPR (or configured integrally) and the drain electrode is electrically connected to the readout line ROL (or configured integrally).

Figure 7:
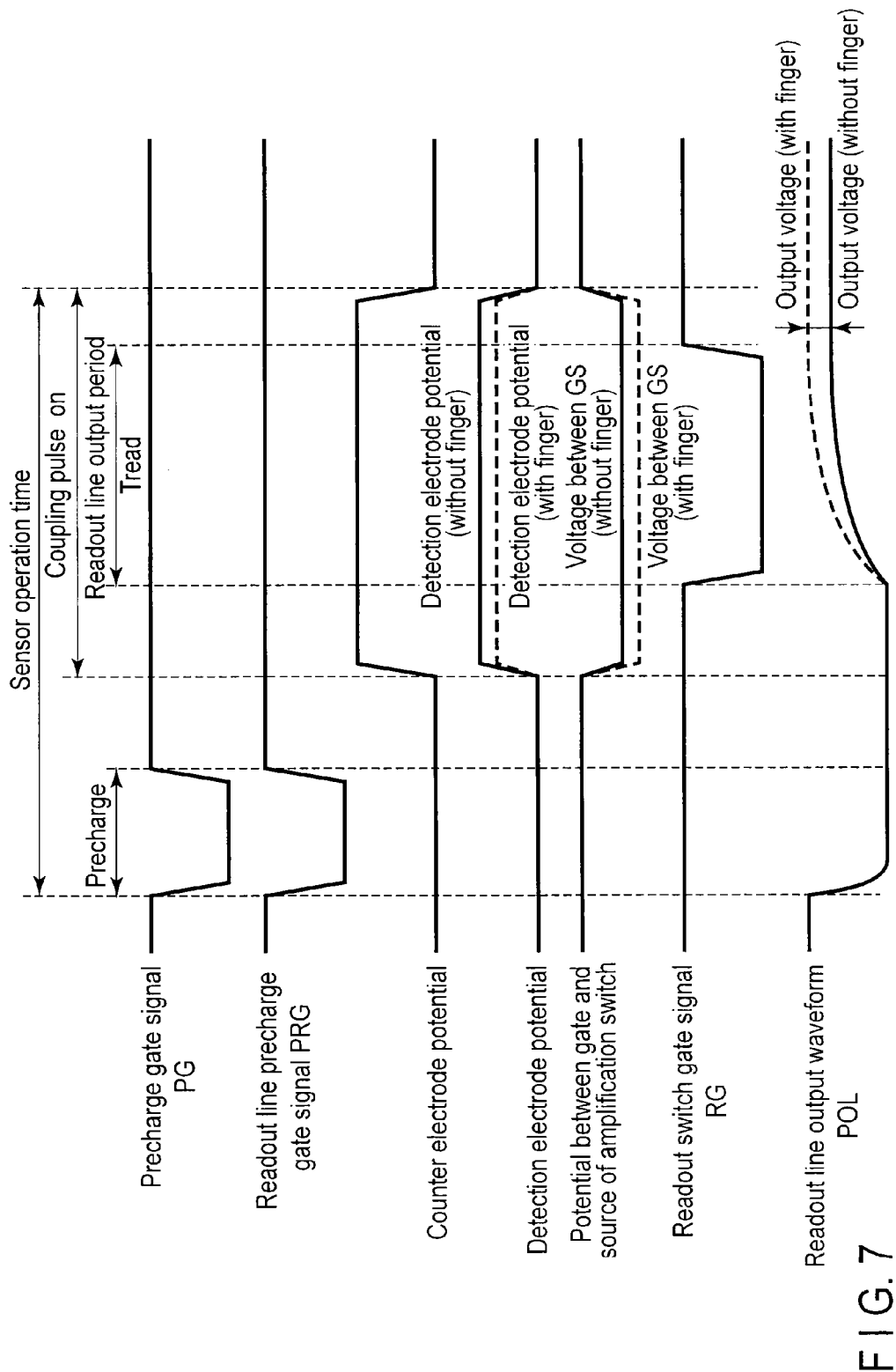
FIG. 7 is an exemplary timing chart illustrating how to drive the sensor circuit of the display device of the first embodiment.

FIG. 7 is an exemplary timing chart illustrating how to drive the sensor circuit 12 of the display device of the first embodiment.

[Initialization Operation]

A precharge gate line drive waveform (precharge gate signal waveform) is applied to the precharge gate line PG and input to the gate electrode terminal of the precharge switch SWA. As a result, a precharge voltage Vprc is written in the detection electrode 12E through the precharge switch SWA at a timing when the level of the precharge gate signal is on (low).

The readout line precharge gate line drive waveform is applied to the readout line precharge gate line PRG and input to the gate electrode terminal of an external switch (the precharge switch SWD). As a result, a precharge voltage is written from the readout line precharge line RPR to the readout line ROL via the external switch (the precharge switch SWD) at a timing when the level of the readout line precharge gate signal is on (low). An initial voltage of the readout line ROL is thereby set.

[Detection Operation]

When a finger approaches the detection electrode 12E, a potential varies in the detection electrode 12E when the counter electrode potential is changed by the presence or absence of finger, since capacitance is formed between the finger and the detection electrode 12E. A detection electrode potential waveform indicates the potential variation of the detection electrode 12E and can cause the voltage difference between a detection electrode potential (without finger) and a detection electrode potential (with finger) when a counter electrode potential is changed.

A counter electrode potential waveform is a pulse waveform of the common voltage Vcom driven by the counter electrode drive circuit CD. By driving the common voltage Vcom, a potential of the detection electrode 12E varies via the coupling capacitance C1. Therefore, in the first embodiment, the common voltage Vcom is driven as a pulse and the floating capacitance C1 is used as coupling capacitance. This eliminates the need to provide as an exclusive element the coupling capacitance C1 that has been conventionally provided exclusively, which makes it possible to constitute the other electrode of the coupling capacitance C1 by the same layer as the layer of the counter electrode.

On the other hand, a predetermined voltage is imparted to the amplification source line Vs. Accordingly, this predetermined voltage is applied to the source terminal of the amplification switch SWB. Differences occur by the presence or absence of finger in the voltage waveform between the gate and the source (GS) of the amplification switch SWB. This indicates that the voltage difference that occurs in the detection electrode 12E is reflected on the difference of the operation point of the amplification switch SWB. That is, differences occur in the voltage between the gate and the source (GS) of the amplification switch SWB between the voltage between GS (without finger) and the voltage between GS (with finger); differences occur in an on-resistance of the amplification switch SWB by the presence or absence of finger. This causes differences in the rising rate of a voltage generated in the drain of the amplification switch SWB.

In the first embodiment, the amplification source line Vs, which imparts the power source voltage of the amplification switch SWB, is provided separately from the common voltage Vcom imparted to the above-mentioned coupling capacitance C1. Therefore, the voltage imparted to the amplification source line Vs can be set flexibly so that the readout detection voltage is an optimum value to curb the cost of circuit components.

The readout gate line drive waveform is applied to the readout gate line RG and input to the gate electrode terminal of the readout switch SWC. At a timing when the level of the readout switch gate signal is on (low), a voltage of the drain of the amplification switch SWB is output to the readout line ROL via the readout switch SWC. That is, a potential of the detection electrode 12E is amplified and output to the readout line ROL at an on-level timing.

As the readout line output voltage waveform indicates such a voltage variation. The output voltage output to the readout line ROL at a timing when the level of the readout switch gate signal is on, a voltage increases at an increase rate according to the coupling capacitance C1 and the floating capacitance that occurs to the detection electrode 12E by contact of a finger. Therefore, voltage differences occur between the output voltage (with finger) and the output voltage (without finger).

Next, an explanation will be given on a signal transfer operation between the sensor circuit 12 and the timing controller TCON (or a control circuit provided outside or a control circuit provided on a TFT substrate).

When the sensor circuit 12 is driven, the timing controller TCON firstly controls the scanning line drive circuit YD and makes the level of a voltage applied to the precharge gate line PG low (L) to turn on the precharge switch SWA. The timing controller TCON controls the signal line driving circuit XD to apply a precharge voltage to the precharge line PRL and apply a precharge voltage to the detection electrode 12E via the switch SWA.

At the same time, the timing controller TCON applies a low-level voltage to the readout line precharge gate line PRG to turn on the precharge switch SWD and applies the readout line precharge voltage (for example, 0V) to the readout line ROL via the precharge switch SWD. The readout line voltage turns 0V.

Subsequently, the timing controller TCON turns off the precharge switches SWA and SWD and controls the counter electrode drive circuit CD to make the level of the voltage Vcom of the counter electrode CE high (H). As the level of a potential of the counter electrode CE changes from low to high, a potential of the detection electrode 12E is increased by the coupling capacitance C1. At this time, the amount of variation differs according to the capacitance coupled to the detection electrode 12E.

For example, when a tip of finger or pen is adjacent to the above of the detection electrode 12E, floating capacitance occurs between the detection electrode 12E and the finger. This reduces a potential of the detection electrode 12E as compared with the absence of a tip of finger or pen.

When a potential of the detection electrode 12E differs, an on-resistance of the amplification switch SWB differs due to the difference in the voltage between the gate and the source of the amplification switch SWB. In the first embodiment, when a tip of finger or pen is adjacent to the above of the detection electrode 12E, a potential of the detection electrode 12E decreases. In such a case, the voltage between the gate and the source of the amplification switch SWB increases while an on-resistance of the amplification switch SWB decreases. Also, when a tip of finger or pen is not adjacent to the above of the detection electrode 12E, a potential of the detection electrode 12E is relatively high. In such a case, the voltage between the gate and the source of the amplification switch SWB is relatively small while an on-resistance of the amplification switch SWB is relatively large.

Then, the timing controller TCON controls the scanning line drive circuit YD to turn on the readout switch SWC by making the level of a voltage of the readout gate line RG low. Since the readout line ROL has, for example, capacitance for retaining a voltage (not shown) or predetermined floating capacitance (not shown), a voltage output to the readout line ROL increases at an increase rate in accordance with an on-resistance of the amplification switch SWB. That is, when a tip of finger or pen contacts the above of the detection electrode 12E, if the readout line switch SWC is turned on, a voltage of the readout line ROL increases at an increase rate in accordance with a voltage of the detection electrode 12E via the amplification switch SWB and the readout switch SWC.

Therefore, a potential of the readout line ROL varies to a greater extent during a predetermined period when the readout line switch SWC is turned on, when a tip of finger or pen contacts than when a tip of finger or pen does not contact. As the readout line precharge signal written in advance is retained in the readout line ROL, a potential of the readout line ROL starts to vary gradually toward the high potential when the readout gate line RG is turned on. While a potential of the readout line ROL continues to vary during a readout line output period Tread, when the readout gate line is turned off again, a certain voltage is retained thereafter.

It is then possible to detect a position where a tip of finger or pen contacts, by detecting the difference of an output voltage between the output voltage (with finger) and the output voltage (without finger) during the output period Tread after the readout gate is turned on.

FIG. 8 is an exemplary view of the array substrate 10 of the display device of the first embodiment.

A display pixel PX comprises a red display pixel PXR comprising a red-color layer, a green display pixel PXG comprising a green-color layer and a blue display pixel PXB comprising a blue-color layer. The red display pixel PXR, the green display pixel PXG and the blue display pixel PXB constitute a display pixel unit PXU.

The respective pixel electrode PE constituting each color pixel represented by PXR, PXG and PXB in the figure is formed by transparent conductive material such as indium tin oxide (ITO). The display pixels PXs are arranged periodically in a row direction D1. The detection electrodes 12E have the same layer as, for example, the pixel electrode PE, and are arranged periodically in the row direction D1 in the row between the display pixel rows. On the other hand, the sensor circuits 12 are also arranged in the row between the display pixel rows.

Note that the counter substrate 20 is provided on the face opposed via the array substrate 10 and the liquid crystal layer LQ. The counter substrate 20 comprises a transparent insulating substrate (not shown), the counter electrode CE having an aperture in a portion opposed to the detection electrode 12E on the transparent insulating substrate, a color layer (not shown) arranged in the display pixel PX and a light-shielding layer (not shown) arranged in a region around the display unit DYP and around the display pixel PX.

The color layer comprises a red-color layer configured to transmit light of a red-color main wavelength, a green-color layer configured to transmit light of a green-color main wavelength, and a blue-color layer configured to transmit light of a blue-color main wavelength. The red-color layer, the green-color layer and the blue-color layer are respectively arranged to extend in a column direction D2 of the plurality of display pixels PXs and arranged side by side periodically in the row direction D1.

It may be possible that the detection electrode 12E is formed by a layer different from that of the pixel element PE in the array substrate 10 opposed to the aperture of the counter electrode CE.

Figure 9:
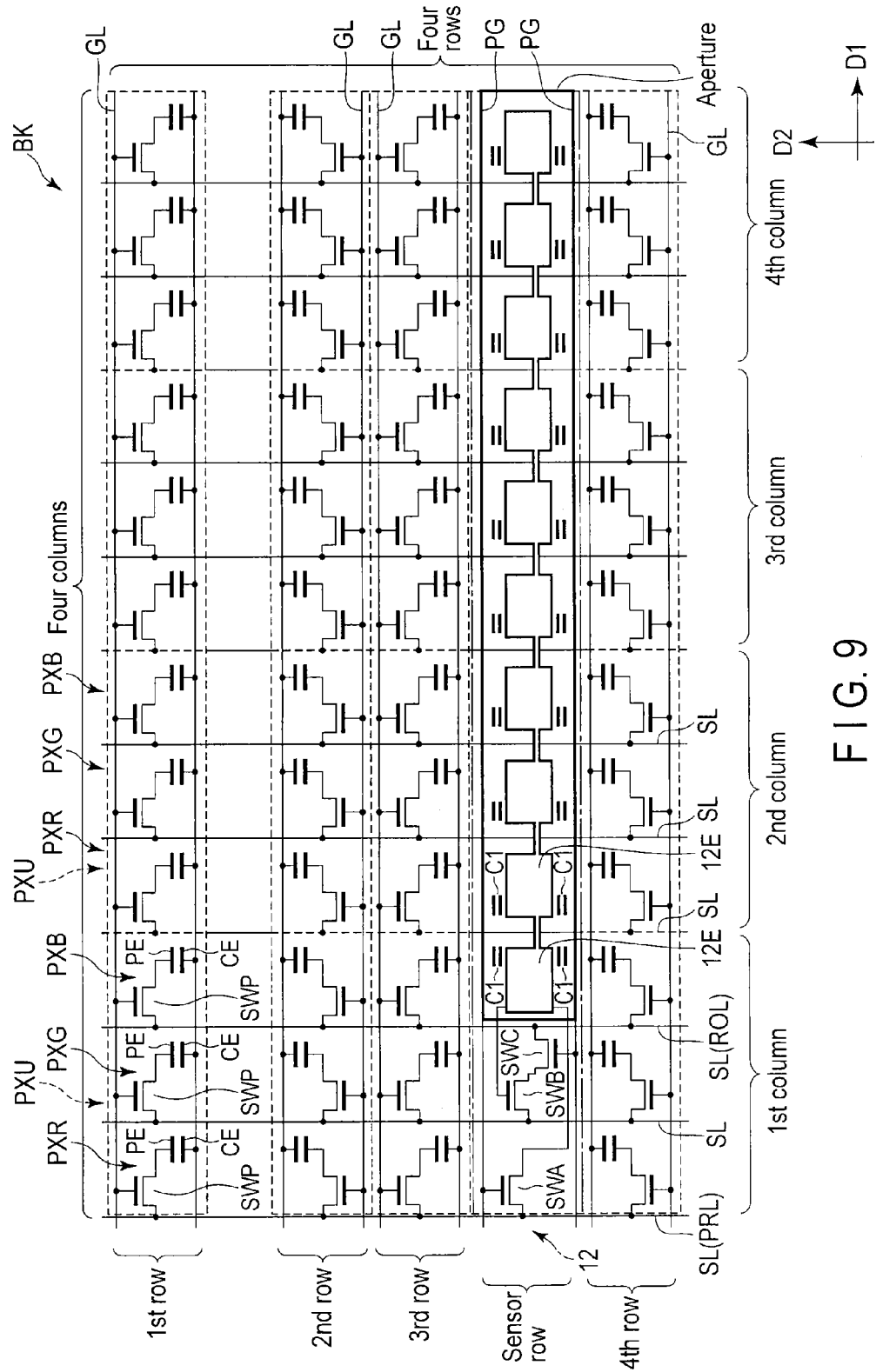
FIG. 9 is an exemplary view of an arrangement of the sensor circuit of the display device of the first embodiment.

FIG. 9 is an exemplary view of an arrangement of the sensor circuit 12 of the first embodiment.

In FIG. 9, the display pixels PXs are inversely arranged so as to be symmetry with respect to the row direction D1 for each row. The display pixels PXs are arranged at intervals for every two rows. The sensor circuit 12 is provided in a region between the two rows of the display pixel PX.

Note that while one of the sensor circuits 12 is arranged in the display pixel unit PXU in four rows and four columns, the sensor circuit 12 is not limited to this embodiment and may not be arranged in other display pixel unit PXUs. That is, at least one of the sensor circuits 12 can be arranged in a display pixel unit in n row(s) and m column(s).

In addition, as shown in FIG. 9, an aperture is provided in a portion opposed to the detection electrode 12E of the counter electrode CE. The detection electrode 12 is formed by ten continuous block electrodes connected in a row direction. The aperture is arranged so as to include all the ten continuous block electrodes but is not limited to this embodiment. That is, the aperture may be arranged so as to include a part of the block electrodes. It may also be possible that a plurality of apertures are provided for one of the detection electrodes 12E.

As mentioned above, the display device of the first embodiment is configured to detect a position that is contacted by a tip of finger or pen on the transparent insulating substrate of the counter substrate 20 and a position that is not contacted, by the difference of an output voltage of the sensor circuit 12.

In such a case, detection sensitivity can be improved by setting to the output period Tread when an output voltage difference by the presence or absence of finger is the largest. While the same precharge line PRL may be used in the plurality of sensor circuits, it is possible to control a signal to noise ratio (S/N) of the sensor circuits 12 individually by separating the sensor circuits 12, providing the precharge switch SWA for each precharge line PRL and by controlling its applied voltage (precharge voltage).

FIG. 10 is an exemplary graph illustrating a relationship between the precharge voltage Vprc of the display device and the output voltage of the sensor circuit 12 (voltage of the readout line ROL) in the first embodiment.

In FIG. 10, an output voltage by the presence or absence of finger is shown for a plurality of times. The curved lines in the graph are shifted laterally in accordance with measurement conditions. It is possible to maintain the S/Ns of all of the sensor circuits 12 to the maximum by adjusting a precharge voltage for each of the sensor circuits 12 so as to maximize the difference of an output voltage by the presence or absence of finger.

Figure 12:
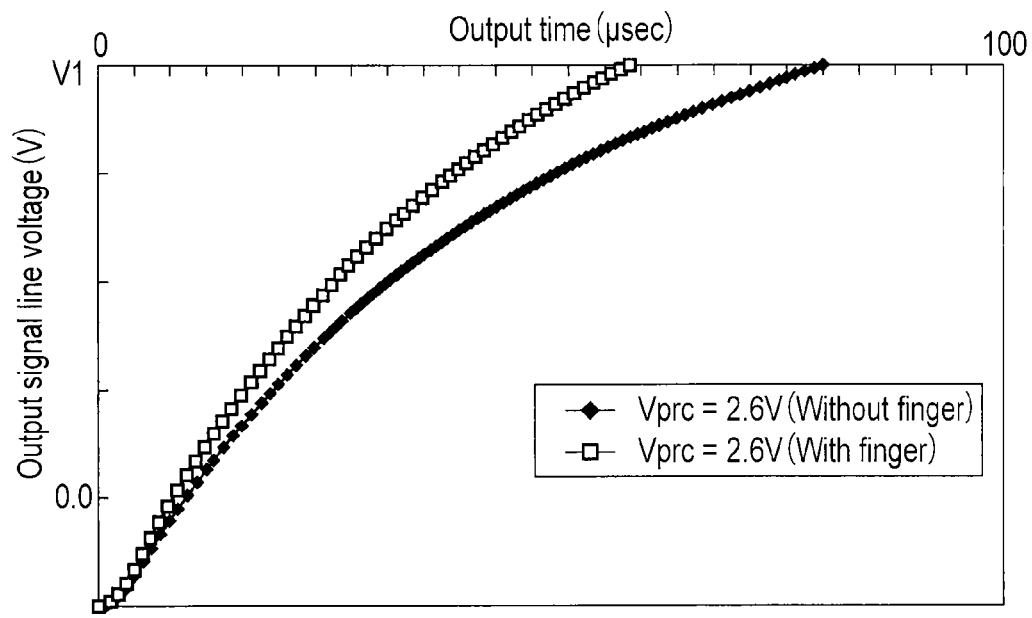
FIG. 12 is an exemplary graph illustrating a relationship between the output voltage and the output time of the sensor circuit when the precharge voltage of the display device of the first embodiment is increased.

FIG. 11 is an exemplary graph illustrating, by the presence or absence of finger, a relationship between the output voltage and the output time of the sensor circuit 12 in the display device of the first embodiment. FIG. 12 is an exemplary graph illustrating, by the presence or absence of finger, a relationship between the output voltage and the output time of the sensor circuit 12 in the display device of the first embodiment when the precharge voltage Vprc is increased.

The comparison between the graph of FIG. 11 and the graph of FIG. 12 reveals that it takes longer to reach a prescribed voltage V1 as the precharge voltage Vprc gets larger and that the difference of an output voltage gets larger by the presence or absence of finger. However, since this characteristic depends on a voltage applied to the amplification source line Vs, the precharge voltage Vprc is set to an optimum value in accordance with a voltage of the amplification source line Vs.

Note that the operation time of the sensor circuits is not infinite in the first embodiment since the readout line ROL of the sensor circuit 12 is also used as the signal line SL, which supplies a video signal to the pixel electrode PE. It is therefore likely that if the precharge voltage Vprc is increased too much, a prescribed voltage is not reached within the operation time of the sensor circuit 12 regardless of the presence or absence of contact.

The maximum S/N can be obtained within the operation time of the sensor circuit 12 by always monitoring a time to reach the prescribed voltage V1 by, for example, a control circuit provided outside and by optimizing the precharge voltage Vprc. That is, it is possible to maintain the S/Ns of all of the sensor circuits 12 to the maximum by adjusting the precharge voltage Vprc for each of the sensor circuits 12.

On the other hand, the adjustment of the voltages of all the signal lines SLs may lead to cost rise as it makes the number of precharge voltage output circuits vast. The maximization and cost reduction of S/N can be realized by bundling a certain number of signal lines SLs and adjusting the precharge voltage Vprc for each area of the display unit DYP.

Figure 13:
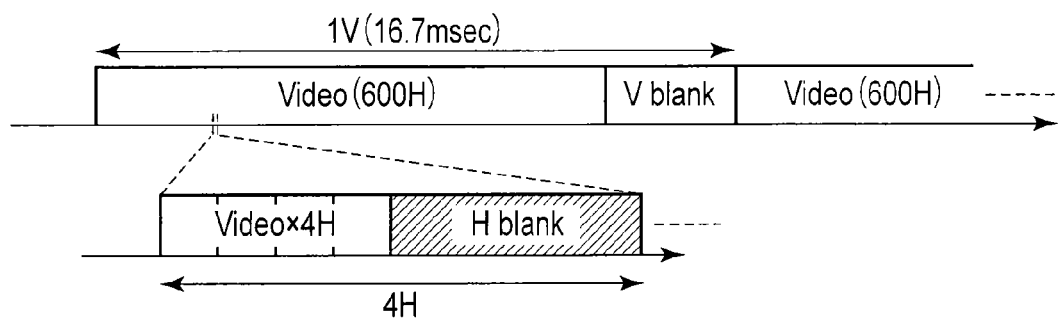
FIG. 13 is an exemplary graph illustrating a timing of driving the sensor circuit of the display device of the first embodiment.

FIG. 13 is an exemplary graph illustrating a timing of driving the sensor circuit 12 of the display device of the first embodiment. FIG. 13 shows, for example, that the display unit DYP comprises the display pixel PX in 600 rows×800 columns and the sensor circuit 12 is driven in the display device in which the sensor circuit 12 in 150 rows×200 columns is arranged. That is, one of the sensor circuits 12 is provided for each 4×4 display pixel unit.

The scanning line drive circuit YD and the signal line drive circuit XD are controlled so as to write a video signal of one row in the pixel electrode PE during one horizontal (1H) period and to write a video signal of one screen displayed in the display unit DYP in the pixel electrode PE during one vertical period (1V). One vertical period is, for example, 16.7 msec, including 600 horizontal periods and a vertical black period (V blank).

In the first embodiment, during the four horizontal periods (4H), video signals of four rows are written in the corresponding pixel electrode PE and then the sensor circuit 12 is driven. This operation is repeated by each four horizontal periods in the scanning line drive circuit YD and the signal line drive circuit XD.

Since one of the sensor circuits 12 is arranged in the display pixel unit PXU in four rows and four columns, it is possible to drive all the sensor circuits 12 arranged in the display unit DYP during one vertical period by driving the sensor circuit 12 in one row during a period of driving the display pixels PXs in four rows.

Figure 14:
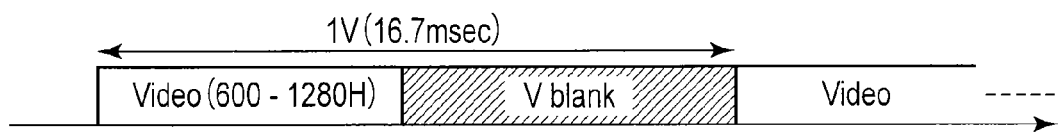
FIG. 14 is another exemplary graph illustrating the timing of driving the sensor circuit of the display device of the first embodiment.

FIG. 14 is another exemplary graph illustrating a timing of driving the sensor circuit 12 of the display device of the first embodiment.

In FIG. 14, the scanning line drive circuit YD and the signal line drive circuit XD write video signals sequentially in all the pixel electrodes PEs during one vertical period and drive all the sensor circuits 12 sequentially.

Note that the sensor circuit 12 may be driven during a couple of vertical periods, not all the vertical periods. For example, it may be possible to control the scanning line drive circuit YD and the signal line drive circuit XD so that the sensor circuit 12 is not driven in a mode of stopping a touchpanel function and that the sensor circuit 12 is driven during every couple of vertical periods in a standby mode of the touchpanel function.

Also, while the sensor circuit 12 of one row is driven once during four horizontal periods in FIG. 13 and the sensor circuit 12 of one row is driven once during one vertical period in FIG. 14, a timing of driving the sensor circuit 12 is not limited thereto. For example, it may be possible to divide one vertical period into two periods and to drive the sensor circuit 12 after writing a video signal in each of the one-half vertical periods. In such a case, the scanning line drive circuit YD and the signal line drive circuit XD may be configured to drive the even-numbered sensor circuits 12 and the odd-numbered sensor circuits 12 alternately by each one-half vertical period.

Figure 15:
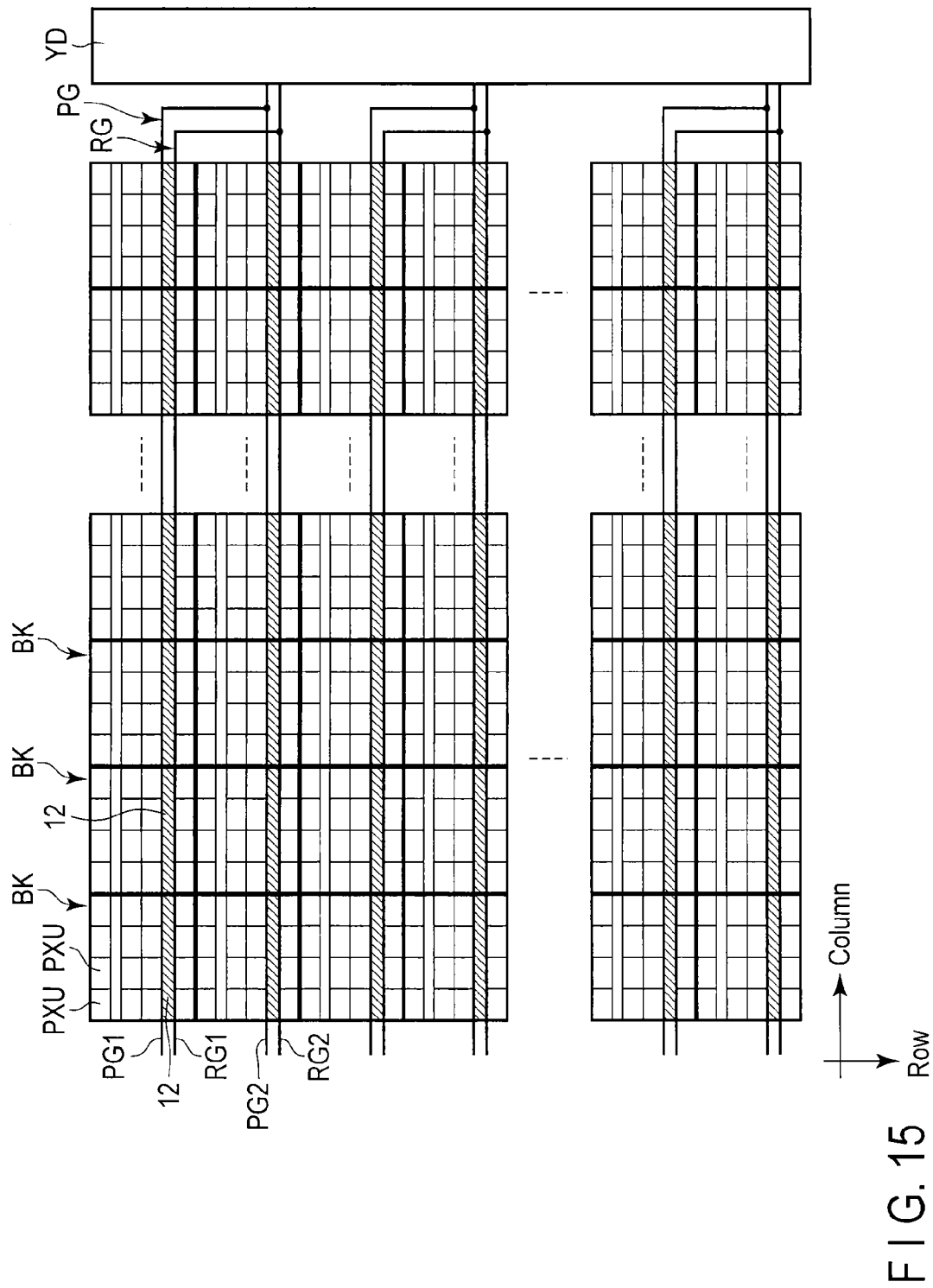
FIG. 15 is an exemplary view illustrating an arrangement position of the sensor circuit, a precharge gate line and the readout gate line of the display device of the first embodiment.

FIG. 15 is an exemplary view illustrating an arrangement position of the sensor circuit, the precharge gate PG line and the readout gate line RG of the display device of the first embodiment.

One of the sensor circuits 12 is arranged in each block BK in four rows and four columns, which is arranged by the display pixel unit PXU. The sensor circuits 12 are arranged side by side in a direction almost parallel to a direction of extending the scanning line GL, in a region between the third row and the fourth row of the display pixel unit PXU arranged in four rows and four columns.

The precharge gate line PG comprises a first branch wiring PG1 extending along with the sensor circuits 12 arranged side by side in the block BK of the first row and a second branch wiring PG2 extending along with the sensor circuits 12 arranged side by side in the block BK of the second row next to the first row. The readout gate line RG comprises a first branch wiring RG1 extending along with the sensor circuits 12 arranged side by side in the block BK of the first row and a second branch wiring RG2 extending along with the sensor circuits 12 arranged side by side in the block BK of the second row next to the first row.

When the precharge gate line PG and the readout gate line RG are thus configured, the scanning line drive circuit YD can drive the sensor circuits 12 by each two rows. By driving the sensor circuits 12 by each two rows, the S/N difference of the sensor circuits 12 can be increased since the amplification capability almost doubles.

Figure 16:
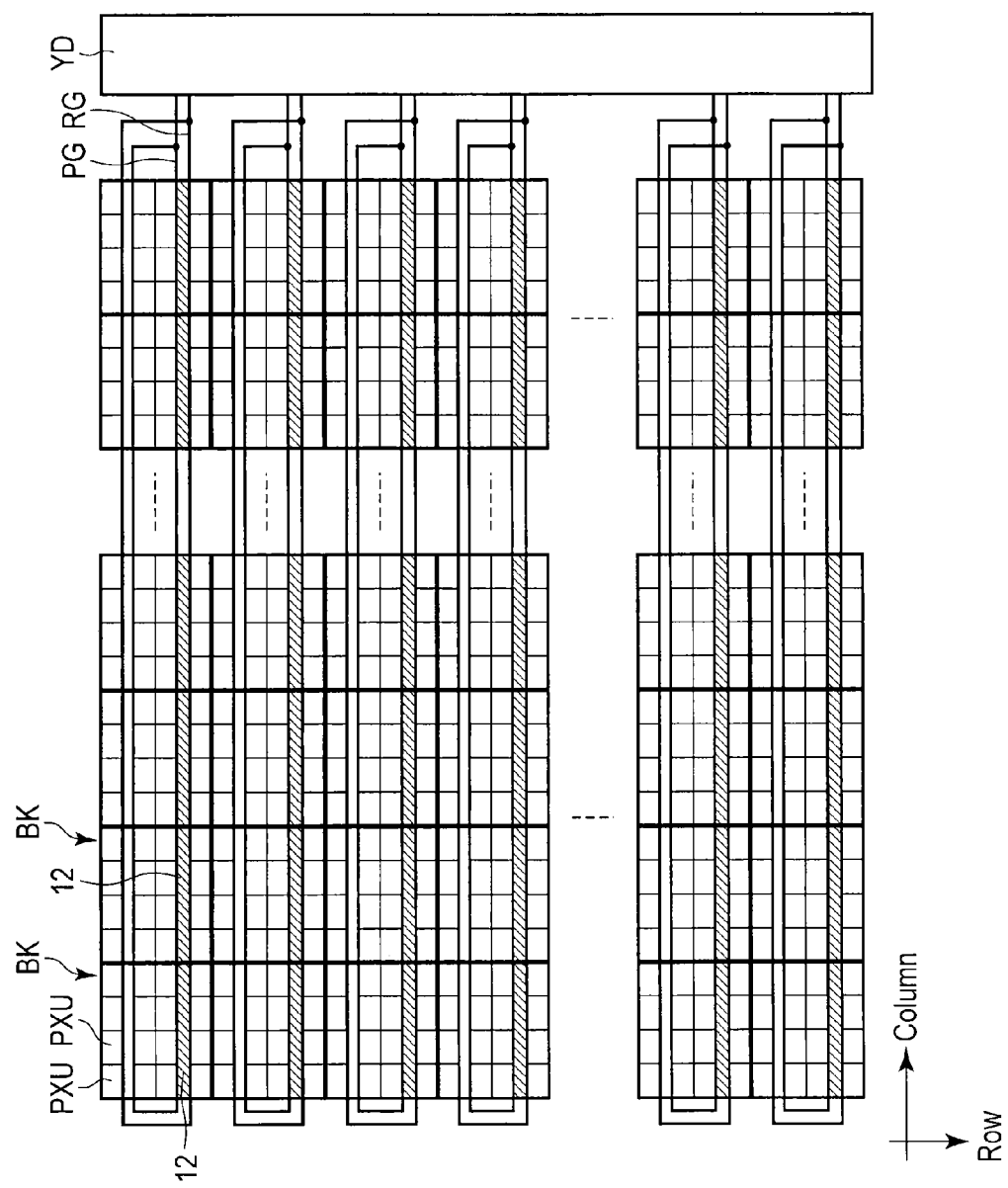
FIG. 16 is another exemplary view illustrating the arrangement position of the sensor circuit, the precharge gate line and the readout gate line of the display device of the first embodiment.

FIG. 16 is another exemplary view illustrating the arrangement position of the sensor circuit 12, the precharge gate line PG and the readout gate line RG of the display device of the first embodiment. In FIG. 16, the arrangement position of the sensor circuit 12 is the same as that of FIG. 15 while the arrangement of the precharge gate line PG and the readout gate line RG differs.

The precharge gate line PG is configured in a loop by wirings extending in a direction almost parallel to the scanning line GL and wirings connecting the end portions of these wirings, in a region between the first-row display and the second-row display pixel units PXUs and a region between the third-row display and the fourth-row display pixel units PXUs, in each row of the block BK.

Similarly, the readout gate line RG is configured in a loop by wirings extending in a direction almost parallel to the scanning line GL and wirings connecting the end portions of these wirings, in a region between the first-row and second-row display pixel units PXUs and a region between the third-row and fourth-row display pixel units PXUs, in each row of the block BK.

When the precharge gate line PG and the readout gate line RG are thus configured, the S/N can be improved as the difference of a signal at the left and right ends of the wirings gets smaller.

Figure 17:
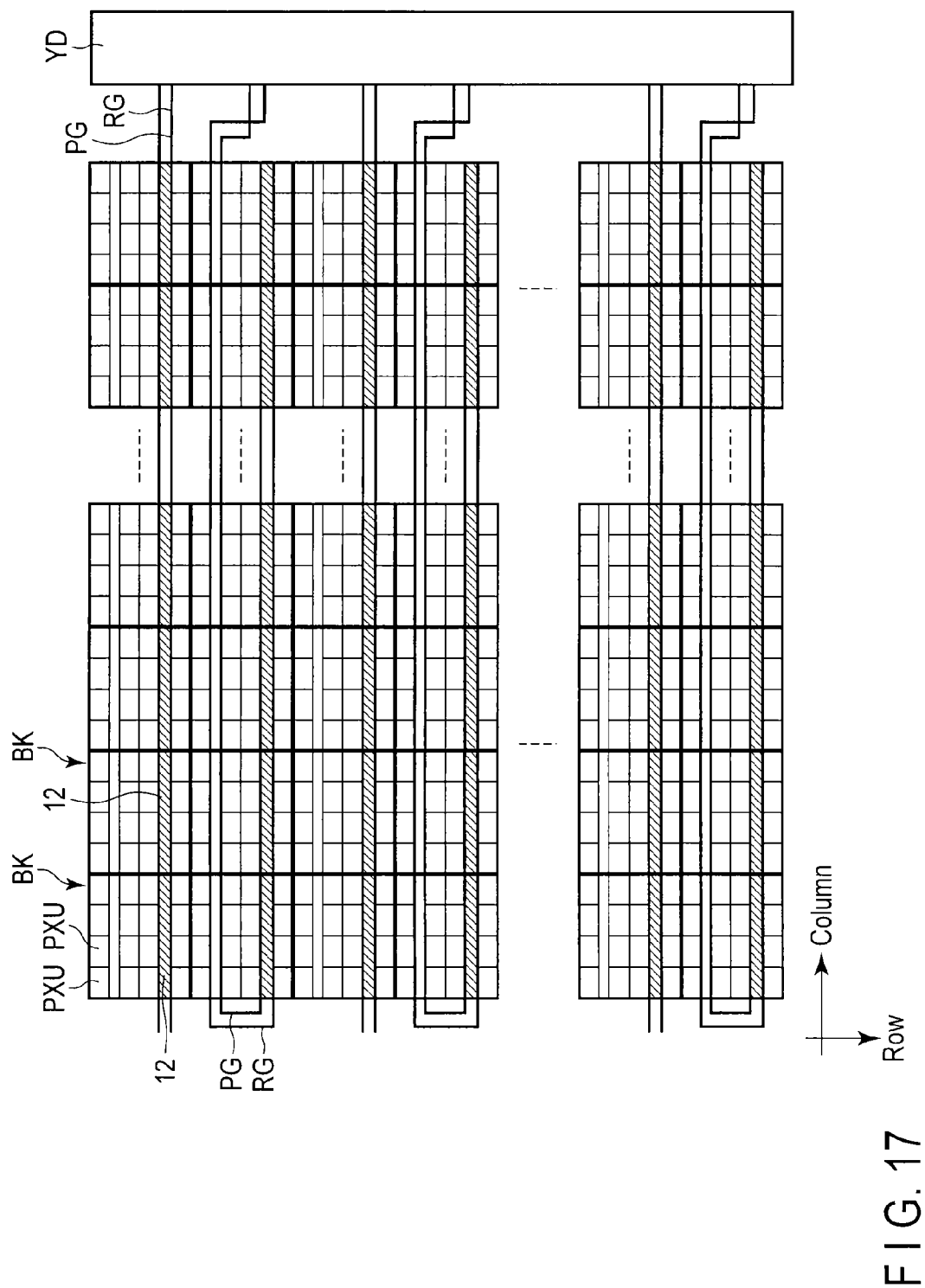
FIG. 17 is still another exemplary view illustrating the arrangement position of the sensor circuit, the precharge gate line and the readout gate line of the display device of the first embodiment.

FIG. 17 is still another exemplary view illustrating the arrangement position of the sensor circuit 12, the precharge gate line PG and the readout gate line RG of the display device of the first embodiment. In FIG. 17, the arrangement position of the sensor circuit 12 is the same as that of FIG. 15 while the arrangement of the precharge gate line PG and the readout gate line RG differs.

In the precharge gate line PG and the readout gate line RG, a direction of supplying a signal differs between the sensor circuits 12 arranged in the odd-numbered blocks BKs and the sensor circuits 12 arranged in the even-numbered blocks BKs.

In the odd-numbered blocks BKs, the precharge gate line PG and the readout gate line RG are arranged to extend in the sensor circuits 12 in a region between the third-row and fourth-row display pixel units PXUs.

In the even-numbered blocks BKs, the precharge gate line PG and the readout gate line RG are arranged to extend in the sensor circuits 12 in a region between the display pixel units in the third and fourth rows from the opposite side in a column direction, via a region between the first-row and second-row display pixel units PXUs.

When the precharge gate line PG and the readout gate line RG are thus configured, the S/N can be improved as the difference of the signals at both ends of the display unit DYP in a column direction gets smaller.

Figure 18:
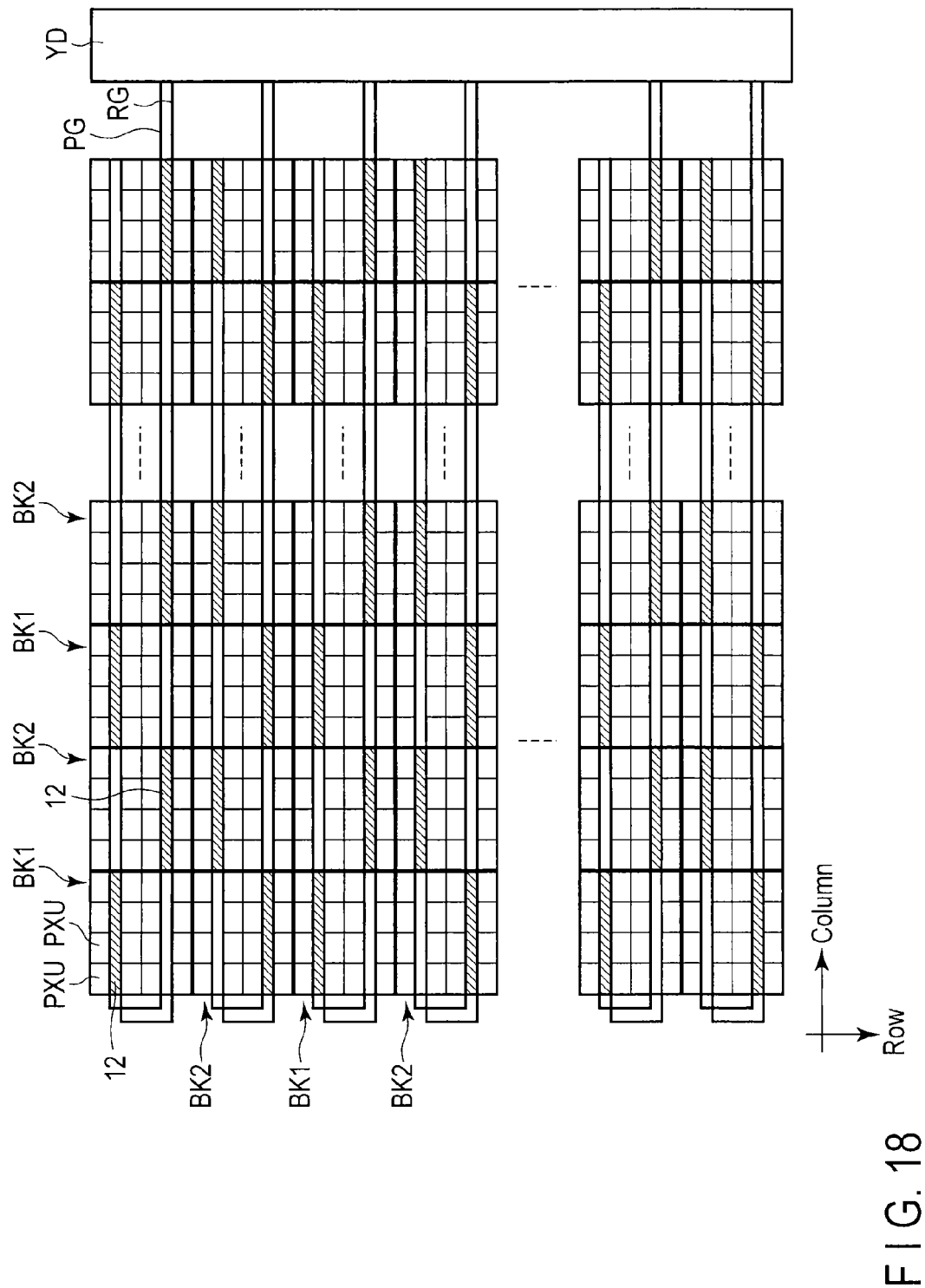
FIG. 18 is further another exemplary view illustrating the arrangement position of the sensor circuit, the precharge gate line and the readout gate line of the display device of the first embodiment.

FIG. 18 is further another exemplary view illustrating the arrangement position of the sensor circuit 12, the precharge gate line PG and the readout gate line RG of the display device of the first embodiment. One of the sensor circuits 12 is arranged for each block BK in four rows and four columns, which is arranged by the display pixel unit PXU. The sensor circuits 12 are arranged in a region between the first row and the second row or a region between the third row and the fourth row of the display pixel unit PXU arranged in four rows and four columns.

In the first block BK1, the sensor circuit 12 is arranged in a region between the first-row and the second-row display pixel unit PXUs. In the second block BK2, the sensor circuit 12 is arranged in a region between the third-row and the fourth-row display pixel unit PXUs. The first block BK1 and the second block BK2 are alternately arranged in a direction in which the signal line SL extends (row direction) and in a direction in which the scanning line GL extends (column direction).

In each row of the blocks BKs, the precharge gate line PG is arranged almost in a J-shape to extend in a direction almost parallel to the scanning line GL in a region between the third-row and the fourth-row display pixel units PXUs and to extend in a direction almost parallel to the scanning line GL in a region between the first-row and the second-row display pixel units PXUs.

Similarly, in each row of the blocks BKs, the readout gate line RG is arranged almost in a J-shape to extend in a direction almost parallel to the scanning line GL in a region between the third-row and the fourth-row display pixel units PXUs and to extend in a direction almost parallel to the scanning line GL in a region between the first-row and the second-row display pixel units PXUs.

When the sensor circuit 12, the precharge gate line PG and the readout gate line RG are thus configured, the S/N can be improved as the difference of a signal at the left and right ends of the display unit DYP gets smaller.

FIG. 19 is still further another exemplary view illustrating the arrangement position of the sensor circuit 12, the precharge gate line PG and the readout gate line RG of the display device of the first embodiment. One of the sensor circuits 12 is arranged by each block BK in four rows and four columns, which is arranged by the display pixel unit PXU. The sensor circuits 12 are arranged in a region between the first row and the second row or in a region between the third row and the fourth row of the display pixel unit PXU arranged in four rows and four columns.

In the odd-numbered blocks BKs, the sensor circuit 12 is arranged in a region between the first-row and the second-row display pixel units PXUs. In the even-numbered blocks BKs, the sensor circuit 12 is arranged in a region between the third-row and the fourth-row display pixel units PXUs.

In the odd-numbered blocks BKs, the precharge gate line PG is arranged almost in a J-shape to extend in a direction almost parallel to the scanning line GL in a region between the third-row and the fourth-row display pixel units PXUs and to extend in a direction almost parallel to the scanning line GL in a region between the first-row and the second-row display pixel units PXUs. In the even-numbered blocks BKs, the precharge gate line PG is arranged almost in a J-shape to extend in a direction almost parallel to the scanning line GL in a region between the first-row and the second-row display pixel units PXUs and to extend in a direction almost parallel to the scanning line GL in a region between the third-row and the fourth-row display pixel units PXUs.

Similarly, in the odd-numbered blocks BKs, the readout gate line RG is arranged almost in a J-shape to extend in a direction almost parallel to the scanning line GL in a region between the third-row and the fourth-row display pixel units PXUs and to extend in a direction almost parallel to the scanning line GL in a region between the first-row and the second-row display pixel units PXUs. In the even-numbered blocks BKs, the readout gate line PG is arranged almost in a J-shape to extend in a direction almost parallel to the scanning line GL in a region between the first-row and the second-row display pixel units PXUs and to extend in a direction almost parallel to the scanning line GL in a region between the third-row and the fourth-row display pixel units PXUs.

When the sensor circuit 12, the precharge gate line PG and the readout gate line RG are thus configured, the S/N can be improved as the difference of a signal at the left and right ends of the display unit DYP gets smaller.

Second Embodiment

Next, the display device of the second embodiment of the present invention will be described with reference to the accompanying drawings. In the following, the same configurations as the display device of the first embodiment are given the same reference numerals to omit the explanation.

The display device of the second embodiment detects whether a tip of finger or pen contacts, by a time when a potential of the readout line ROL reaches a reference voltage. The circuit substrate 60 comprises a comparator (not shown) configured to compare a time when a potential of the readout line ROL reaches a reference voltage. Except this point, the same holds true for the display device of the first embodiment.

Figure 20:
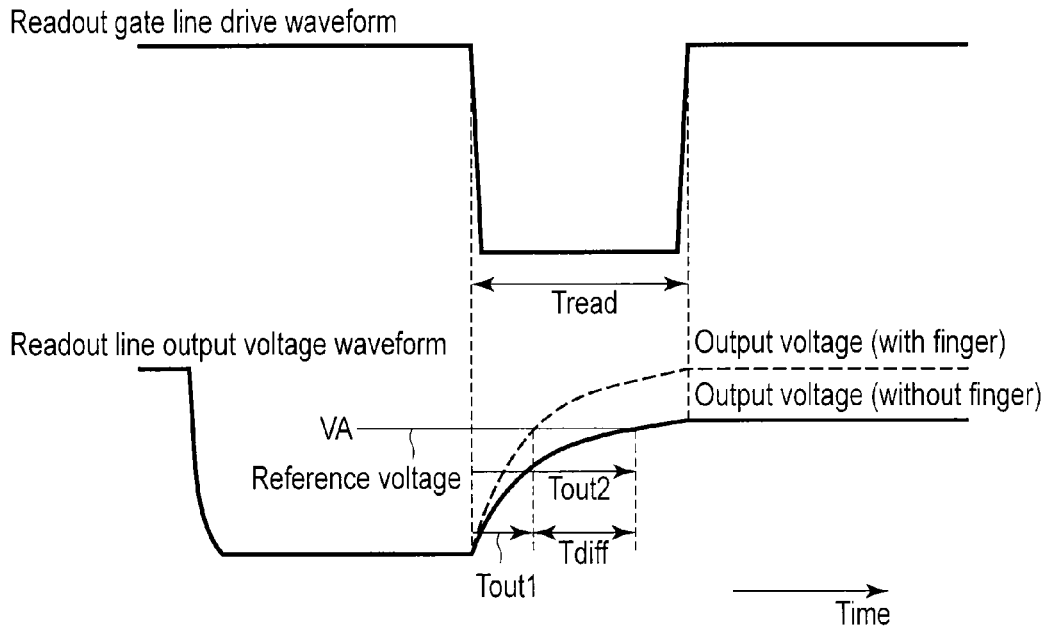
FIG. 20 is an exemplary graph illustrating a drive waveform of the readout gate line and an output voltage waveform of the readout line in a display device of a second embodiment.

FIG. 20 is an exemplary graph illustrating a drive waveform of the readout gate line RG and an output voltage waveform of the readout line ROL in the display device of the second embodiment. The drive waveform of the readout gate line RG and the output voltage waveform of the readout line ROL are the same as those explained in FIG. 7.

In the second embodiment, a reference voltage VA is set to detect an output time difference Tdiff between an output time Tout1 and an output time Tout2, that is, a time when the voltage value of the output voltage waveform of the readout line ROL reaches the reference voltage VA.

The signal line drive circuit XD outputs an output voltage of the readout line ROL to the circuit substrate 60 via a flexible substrate FC2. The circuit substrate 60 converts the output voltage into a digital signal by the A/D conversion unit ADC and outputs it to the external signal source. The output time difference Tdiff is calculated by detecting the output time Tout1 and the output time Tout2 from the comparison between the reference voltage VA and an output voltage to which the external signal source is supplied.

By using such a detection method, it is possible to reduce a voltage that is output to the A/D conversion unit ADC and therefore to save the cost of an image-reading apparatus.

Figure 21:
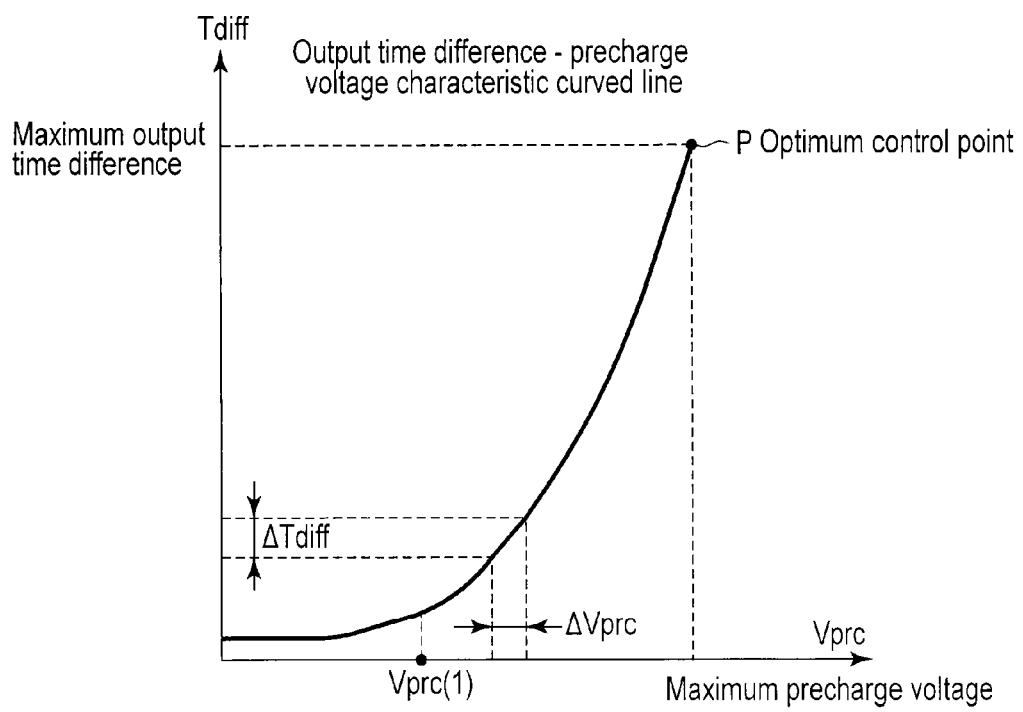
FIG. 21 is an exemplary graph illustrating a curved line of output time difference-precharge voltage characteristic, representing a precharge voltage on a horizontal axis and an output time difference on a vertical axis, in the display device of the second embodiment.

FIG. 21 is an exemplary graph illustrating a curved line of output time difference-precharge voltage characteristic, representing a precharge voltage Vprc on a horizontal axis and an output time difference Tdiff on a vertical axis, in the display device of the second embodiment. As shown in FIG. 21, the curved line of output time difference-precharge voltage characteristic is convex downward, in which the output time difference Tdiff gets larger as the precharge voltage Vprc gets larger.

However, if the precharge voltage Vprc exceeds a predetermined value, the output time difference cannot be detected since a voltage value of the readout line ROL does not reach the reference voltage VA within the output period Tread. The limit of detecting the output time difference Tdiff is a maximum precharge voltage; the output time difference Tdiff at this time is a maximum output time difference.

That is, since detection sensitivity is highest on a point where the output time difference Tdiff reaches the maximum, it is desired that the precharge voltage Vprc be controlled so that its value corresponds to an optimum control point P of the curved line of output time difference-precharge voltage characteristic.

As to the specific control method, it is possible that the precharge Vprc is set at first to a precharge voltage initialization value, then gradually increased and set to a maximum precharge voltage at the end.

By thus setting the precharge voltage Vprc, it is possible to increase the detection sensitivity of the sensor circuit 12 to the maximum.

Note that since the output time Tout1, the output time Tout2 and the output time difference Tdiff depend on a voltage applied to the amplification source line Vs in addition to the precharge voltage Vprc, a voltage applied to the amplification source line Vs is set to a predetermined value in advance.

Figure 22:
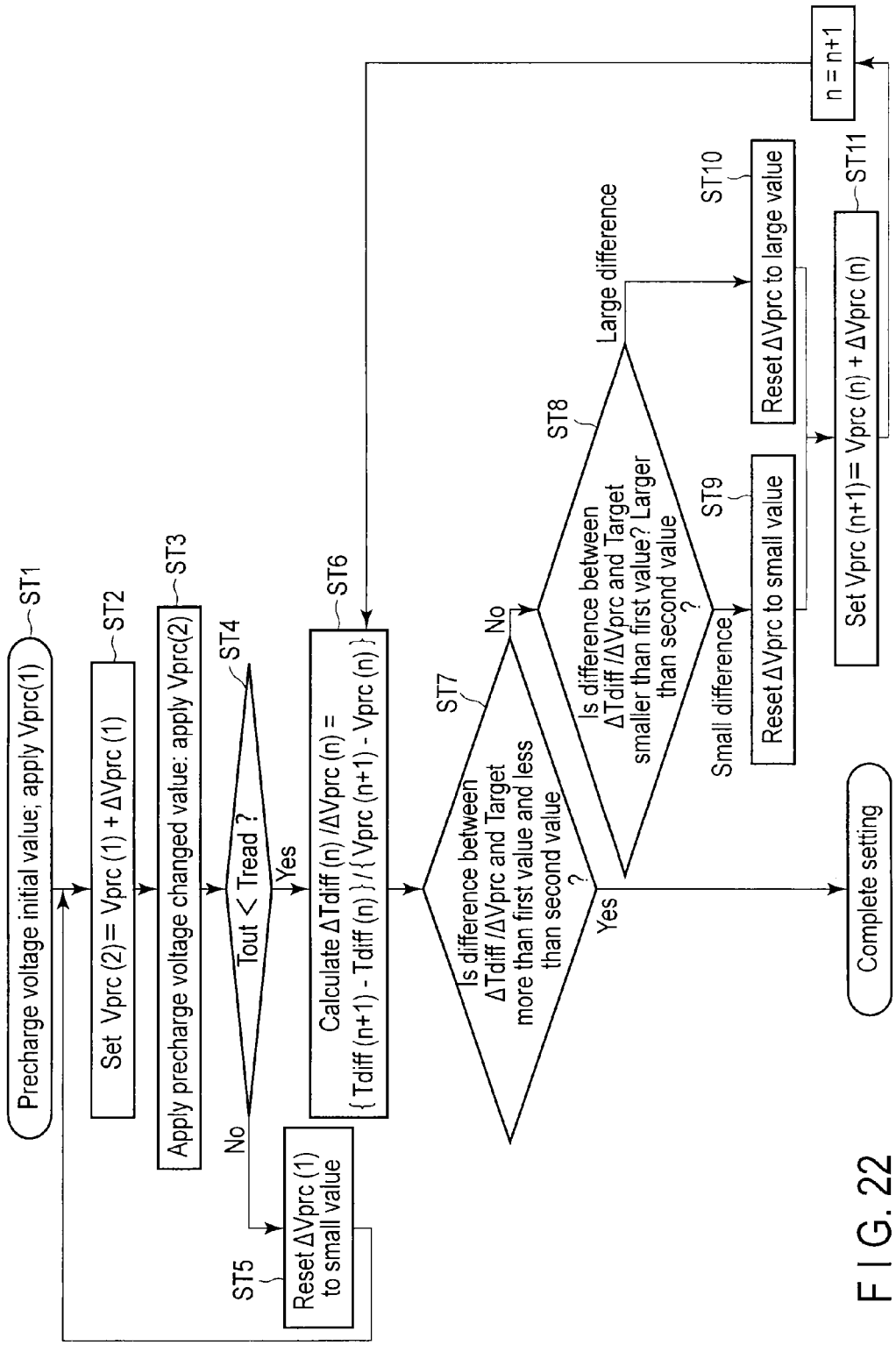
FIG. 22 is an exemplary flowchart illustrating a procedure of setting a precharge voltage to an optimum value in a short time in the display device of the second embodiment.

FIG. 22 is an exemplary flowchart illustrating a procedure of setting the precharge voltage Vprc to an optimum value in a short time in the display device of the second embodiment.

First of all, in step ST1, the precharge voltage initialization value Vprc (1) is applied to the precharge line PRL. In step ST2, the next precharge voltage Vprc (2) (=Vprc (1)+ΔVprc (1)) is calculated to set a value.

Next, in step ST3, the precharge voltage Vprc (2) is applied to the precharge line PRL. In step ST4, the output time Tout1 (with finger) and the output time Tout2 (without finger) for the precharge voltage Vprc (2) are calculated to compare them and the readout line output period Tread. In step ST4, if the output time Tout1 (with finger) or the output time Tout2 (without finger) is larger than the readout line output period Tread (ST4, No), the precharge voltage increase ΔVprc (1) is reset to a small value in step ST5 since the time output time difference Tdiff cannot be detected. In step ST2, the precharge voltage Vprc (2) is recalculated.

On the other hand, in step ST4, if the output time Tout1 (with finger) and the output time Tout2 (without finger) are smaller than the readout line output period Tread (ST4, Yes), the ratio of variation of the output time difference Tdiff over the precharge voltage Vprc (2) is calculated in step ST6 since the output time difference Tdiff can be detected.

At this stage, an output time difference variation ratio Target on the optimum control point P is estimated in advance. In step ST7 and step ST8, the value ΔTdiff/ΔVprc calculated in step ST6 and the estimated value Target are compared. If the difference therebetween is smaller than a predetermined value (first value) (ST8, No), the precharge voltage increase ΔVprc (1) is reset to a small value in step ST9. If the difference therebetween is larger than a predetermined value (second value) (ST8, Yes), the precharge voltage increase ΔVprc (1) is reset to a large value in step ST10. Subsequently, in step ST11, the precharge voltage Vprc is recalculated.

Again, at this stage, the output time difference variation ratio is calculated in step ST6 to repeat a few times a set of steps from the comparison of the output time difference variation ratio (step ST7) to the second calculation of the output time difference variation ratio (step ST6). If the difference between the calculated value ΔTdiff/ΔVprc of the output time difference variation ratio and the estimated value Target of the output time difference variation ratio on the optimum control point P is within a predetermined range (more than first value and less than second value), the final precharge voltage Vprc approaching the maximum precharge voltage is applied to complete the setting.

Note that in the first few times of the second calculation of the output time difference variation ratio (step ST6), it may be possible to return to the output time comparison (step ST4)

before proceeding to the comparison of the output time difference variation ratio (step ST7).

If the output time Tout1 (with finger) or the output time Tout2 (without finger) is larger than the readout line output period Tread as a result of resetting a precharge voltage, this makes it impossible to calculate the output time difference variation ratio in the comparison of the output time difference variation ratio (step ST7) and to proceed to the subsequent steps.

However, if this loop is repeated every time, when the output time Tout1 (with finger) or the output time Tout2 (without finger) is larger than the readout line output period Tread, it takes long to complete the setting since the loop from the initial setting of a precharge voltage (step ST2) to the comparison of an output time (step ST4).

The loop from the comparison of the output time difference variation ratio (step ST7) to the second calculation of the output time difference variation ratio (step ST6) is created to minimize the number of times of repeating this loop and to minimize time loss arising from repetition of the loop from the initial setting of a precharge voltage (step ST2) to the comparison of an output time (step ST4). Therefore, it is possible to adjust the setting of a precharge voltage increase so that the precharge voltage is close to the maximum precharge voltage as much as possible within a range where the output time Tout1 (with finger) and the output time Tout2 (without finger) are not larger than the readout line output period Tread.

Thus, according to the display device of the second embodiment, it is possible to maximize detection sensitivity in a short time by using the control method of a precharge voltage.

Third Embodiment

The configuration of the display device of the third embodiment differs from those of the first and second embodiments.

FIG. 23 is an exemplary diagram illustrating a configuration of a display device of the third embodiment.

In FIG. 23, a circuit substrate 61, which supplies a signal to the array substrate 10, is connected to the end portion on the side opposed to the circuit substrate 60 via a flexible substrate FPC. The circuit substrate 61 is equipped with the timing controller TCON. An output signal of the sensor circuit 12 is transmitted to the A/D conversion unit ADC via the multiplexer MUX, digitalized, and then output to the external signal source. In the external signal source, coordinate calculation is performed from a received digital signal.

FIG. 24 is another exemplary diagram illustrating the configuration of the display device of the third embodiment.

In FIG. 24, the multiplexer MUX, the D/A conversion unit DAC, the comparator COMP, a memory and a microcomputer are equipped in a single chip and arranged on the circuit substrate 60. Thus, a circuit for output processing of the sensor circuit 12 can be put together in a single chip. In this case, it may be possible that coordinate calculation is performed in the microcomputer to output to the external signal source.

FIG. 25 is still another exemplary diagram illustrating the configuration of the display device of the third embodiment.

In FIG. 25, the circuit substrate 60 is equipped with a microcomputer, a memory and the timing controller TCON, and a chip (chip on film; COF) on a flexible substrate is equipped with a comparator and an A/D conversion unit (not shown) configured to convert an output signal of the sensor circuit 12 into a digital signal. An output signal of the sensor circuit 12 is compared with the reference voltage VA in the comparator on the flexible substrate, converted into a digital signal in the A/D conversion unit, and then transmitted to the microcomputer. The microcomputer performs coordinate calculation from a received digital signal to output a detected coordinate to the external signal source.

FIG. 26 is further another exemplary diagram illustrating the configuration of the display device of the third embodiment.

In FIG. 26, a drive circuit, a comparator, and the A/D conversion unit configured to convert an output signal of the sensor circuit 12 into a digital signal are integrally formed on the transparent insulating substrate of the liquid crystal display panel PNL. In this case, the circuit substrate 60 and the external signal source are connected via a serial interface to communicate a digital signal with a video signal of the sensor circuit 12.

Also, the display devices of the first to third embodiments may be a liquid crystal display device that adopts other display modes such as a twisted nematic (TN) mode, a versatile mobile window (VMW) mode, an ISP mode and an optically compensated bend (OCB) mode.

Further, while a display device of color display type has been explained regarding the display devices of the first to third embodiments, the present invention is applicable to a display device of monochrome display type. In this case, color layers are omitted to arrange one of the sensor circuits 12 in each display pixel PX in four rows and twelve columns, for example.

Furthermore, a switch may be added to the sensor circuit 12 to nullify the variation of characteristics of a thin-film transistor even if such a variation occurs. Note that the readout switch SWC, the readout gate line RG and the readout precharge switch SWD may be omitted in the sensor circuit 12. In this case, an output voltage of the amplification switch SWB steadily varies according to its on-resistance by the presence or absence of finger, by electrically connecting the drain electrode and the readout line ROL of the amplification switch SWB and by imparting a predetermined load.

The omission of the readout switch SWC eliminates the need of the readout gate line RG, which controls a voltage applied to its gate electrode. However, in this case, a signal from the sensor circuit 12 in which an output signal from the common readout line ROL is taken out may be output simultaneously.

Therefore, if the readout switch SWC is omitted, the signal line drive circuit XD is configured to vibrate a voltage supplied to the precharge line PRL and a coupling pulse in the same phase. That is, the signal line drive circuit XD controls a pulse voltage supplied to the coupling capacitance C1 so that the gate voltage of the amplification switch SWB connected to the detection electrode 12E is a voltage that do not read out a voltage of the detection electrode, i.e., a voltage in which the readout switch SWC remains off, even if the intensity of capacitive coupling varies by contact of finger and the potential of the detection electrode 12E varies, other than a timing of reading out an output signal from the detection electrode 12E.

As a result, even when the readout switch SWC and the readout gate line RG are omitted, it is possible to perform processing of associating an output signal from the sensor circuit 12 with its position and to provide a display device having a high numerical aperture.

It may be possible that not all of the detection electrodes 12E of the sensor circuits 12 are identical. For example, a sensor (reference sensor) that does not have the detection electrode 12E can be provided in one of the two sensor circuits 12. It is possible to calculate outside the difference of an output voltage between a sensor having the detection electrode 12E and the reference sensor and to determine the presence or absence of touch (contact) by whether the difference exceeds a predetermined threshold.

Also, other than the above-mentioned, the sensor 12 is applicable if it can read out the difference of a potential by the presence or absence of floating capacitance of the detection electrode 12E.

[Effect]

In the display device of each embodiment explained above, a counter electrode is provided with an aperture comprising at least one of the portions opposed to a detection electrode of the counter electrode. An electric field enough to carry out detection between a dielectric such as finger and the detection electrode on the side of an array electrode is thereby formed. During a sensor drive period, a common voltage added to the counter electrode is driven and used as a coupling pulse to read out a detection voltage. Also, a voltage that is a reference of a readout detection voltage is independently supplied to a sensor circuit. Under such a configuration, it is possible to gain a display device that comprises high capability of reading out and realizes cost reduction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel having a counter substrate, an array substrate and a liquid crystal layer held therebetween;
a counter electrode provided on the counter substrate;
a pixel electrode arranged on the array substrate in a matrix;
a sensor circuit arranged between rows of the plurality of pixel electrodes and configured to read out intensity of capacitive coupling between the sensor circuit and a dielectric; and
a counter electrode drive circuit configured to pulsatively drive a common voltage added to the counter electrode during a period of driving the sensor circuit,
wherein
the sensor circuit comprises a detection electrode configured to form first floating capacitance between the sensor circuit and the dielectric and to form second floating capacitance between the sensor circuit and the counter electrode;
the counter electrode comprises an aperture including at least a portion opposed to the detection electrode;
the first floating capacitance is formed between the dielectric and the detection electrode via the aperture;
a potential of the detection electrode varies via the second floating capacitance by pulsatively driving the common voltage; and
the sensor circuit detects presence or absence of the dielectric based on the potential of the detection electrode when a predetermined time has passed since the counter electrode drive circuit started pulsatively driving the common voltage added to the counter electrode.

2. The display device of claim 1, comprising:
a precharge line configured to supply a voltage to the detection electrode;
a readout line configured to read out a detection signal from the detection electrode; and
a precharge gate line, an amplification source line and a readout gate line configured to drive the sensor circuit,
wherein the sensor circuit comprises:
a precharge transistor including a gate electrode, a source electrode, and a drain electrode, in which one of the source electrode or the drain electrode of the precharge transistor is connected to the precharge line, the other one of the source electrode or the drain electrode of the precharge transistor is connected to the detection electrode, and the gate electrode of the precharge transistor is connected to the precharge gate line;
an amplification transistor including a gate electrode, a source electrode, and a drain electrode, in which one of the source electrode or the drain electrode of the amplification transistor is connected to the amplification source line, and the gate electrode of the amplification transistor is connected to the detection electrode; and
a readout transistor including a gate electrode, a source electrode, and a drain electrode, in which one of the source electrode or the drain electrode of the readout transistor is connected to the other one of the source electrode or the drain electrode of the amplification transistor, the other one of the source electrode or the drain electrode of the readout transistor is connected to the readout line, and the gate electrode of the readout transistor is connected to the readout gate line.

3. The display device of claim 1, wherein at least one sensor circuit is arranged in a unit region in which a plurality of pixel circuits are arranged in a plurality of rows and a plurality of columns.

4. The display device of claim 1, wherein a period of driving the sensor circuit is included in a horizontal blanking period.

5. The display device of claim 1, wherein a period of driving the sensor circuit is included in a vertical blanking period.

6. The display device of claim 1, further comprising a time detection module configured to detect a time where an output signal of the sensor circuit reaches a reference voltage.

7. The display device of claim 6, further comprising an adjustment module configured to adjust a time where an output signal of the sensor circuit reaches the reference voltage by controlling the precharge voltage.

* * * * *